US012776248B2

(12) United States Patent
Lee et al.

(10) Patent No.: US 12,776,248 B2
(45) Date of Patent: Oct. 27, 2026

(54) ELECTRONIC DEVICE AND METHOD CONTROLLING COMMAND TO DISPLAY

(71) Applicant: Samsung Electronics Co., Ltd., Suwon-si (KR)

(72) Inventors: Jaesung Lee, Suwon-si (KR); Kyounghwan Kwon, Suwon-si (KR); Jongkon Bae, Suwon-si (KR); Kwangtai Kim, Suwon-si (KR); Donghyun Yeom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/091,377

(22) Filed: Mar. 26, 2025

(65) Prior Publication Data

US 2025/0225911 A1 Jul. 10, 2025

Related U.S. Application Data

(63) Continuation of application No. PCT/KR2023/015156, filed on Sep. 27, 2023.

(30) Foreign Application Priority Data

Sep. 30, 2022 (KR) ........................ 10-2022-0125365
Jan. 4, 2023 (KR) ........................ 10-2023-0001471

(Continued)

(51) Int. Cl.
*G09G 3/20* (2006.01)
*G09G 5/12* (2006.01)

(52) U.S. Cl.
CPC ............. *G09G 3/2096* (2013.01); *G09G 5/12* (2013.01); *G09G 2300/0842* (2013.01);

(Continued)

(58) Field of Classification Search
CPC .. G09G 3/2096; G09G 5/006; G09G 2310/08; G09G 5/12; G09G 2340/0435; G09G 2360/18
See application file for complete search history.

(56) References Cited

U.S. PATENT DOCUMENTS

| | | | |
|---|---|---|---|
| 5,948,091 | A | 9/1999 | Kerigan et al. |
| 6,633,283 | B2 | 10/2003 | Fukuda et al. |

(Continued)

FOREIGN PATENT DOCUMENTS

| | | |
|---|---|---|
| JP | 3753931 B2 | 12/2005 |
| JP | 6742685 B2 | 7/2020 |

(Continued)

OTHER PUBLICATIONS

Extended European Search Report dated Aug. 27, 2025 issued in European Patent Application No. 23873284.6.

(Continued)

*Primary Examiner* — Xuemei Zheng
(74) *Attorney, Agent, or Firm* — NIXON & VANDERHYE P.C.

(57) ABSTRACT

Provided is an electronic device. The electronic device may comprise at least one processor comprising processing circuitry. The electronic device may comprise: a display driving circuit comprising a memory; and a display comprising a display panel. At least one processor, individually and/or collectively, may be configured to: obtain, from a processor, a first image to be transmitted to the display driving circuit; provide, to the display driving circuit, at least one command to be applied to the first image from among the first image and a second image in the memory, within a time period within an extended front porch period of a second vertical synchronization signal for at least one processor, the front porch period being a reference time before a start timing of a first vertical synchronization signal for the processor; and (Continued)

transmit the first image to the display driving circuit based on the start timing.

20 Claims, 10 Drawing Sheets

(30) Foreign Application Priority Data

| | | |
|---|---|---|
| Jan. 11, 2023 | (KR) | 10-2023-0004350 |
| Jan. 31, 2023 | (KR) | 10-2023-0013290 |
| Feb. 23, 2023 | (KR) | 10-2023-0024329 |
| Feb. 28, 2023 | (KR) | 10-2023-0026723 |
| Apr. 3, 2023 | (KR) | 10-2023-0043753 |
| Sep. 25, 2023 | (WO) | PCT/KR2023/014711 |
| Sep. 26, 2023 | (WO) | PCT/KR2023/014940 |

(52) U.S. Cl.
CPC . *G09G 2310/0267* (2013.01); *G09G 2310/08* (2013.01); *G09G 2320/0247* (2013.01); *G09G 2320/0257* (2013.01)

(56) References Cited

U.S. PATENT DOCUMENTS

| | | | | |
|---|---|---|---|---|
| 8,289,306 | B2 | 10/2012 | Unger | |
| 8,451,279 | B2 | 5/2013 | Gorla et al. | |
| 8,654,132 | B2 | 2/2014 | Gorla et al. | |
| 8,878,995 | B2 | 11/2014 | Cha et al. | |
| 9,332,216 | B2 | 5/2016 | Colenbrander | |
| 9,485,426 | B2 | 11/2016 | Sakamoto et al. | |
| 9,619,007 | B2 | 4/2017 | Mizuno et al. | |
| 9,704,215 | B2 | 7/2017 | Kim et al. | |
| 9,830,880 | B1 | 11/2017 | Wyatt | |
| 9,959,589 | B2 | 5/2018 | Bae et al. | |
| 10,062,314 | B2 | 8/2018 | Lee et al. | |
| 10,095,459 | B2 | 10/2018 | Kim | |
| 10,380,934 | B2 | 8/2019 | Kim et al. | |
| 10,810,927 | B2 | 10/2020 | Lee et al. | |
| 11,087,721 | B2 | 8/2021 | Kim et al. | |
| 11,205,400 | B1 | 12/2021 | Jang | |
| 11,270,615 | B2 | 3/2022 | Choi et al. | |
| 11,302,251 | B2 | 4/2022 | Sung et al. | |
| 11,322,079 | B2 | 5/2022 | Wu | |
| 11,386,866 | B2 | 7/2022 | Sin et al. | |
| 11,412,173 | B2 | 8/2022 | Yamamoto et al. | |
| 11,467,692 | B2 | 10/2022 | Kim et al. | |
| 11,501,734 | B2 | 11/2022 | Han et al. | |
| 11,514,873 | B1 | 11/2022 | Chen et al. | |
| 11,676,557 | B2 * | 6/2023 | Park | G09G 5/18 345/1.1 |
| 11,721,272 | B2 | 8/2023 | Lee et al. | |
| 12,018,403 | B2 | 6/2024 | Vasquez et al. | |
| 12,062,316 | B2 | 8/2024 | Kim | |
| 12,165,590 | B2 | 12/2024 | Sang et al. | |
| 12,223,917 | B2 | 2/2025 | Cheon et al. | |
| 2006/0055692 | A1 | 3/2006 | Kuo et al. | |
| 2010/0053182 | A1 | 3/2010 | Jeon et al. | |
| 2011/0018887 | A1 | 1/2011 | Uchiyama | |
| 2013/0044087 | A1 | 2/2013 | Hsu et al. | |
| 2013/0057763 | A1 * | 3/2013 | Cha | G09G 5/006 348/554 |
| 2013/0155036 | A1 | 6/2013 | Kim et al. | |
| 2013/0235055 | A1 | 9/2013 | Kim et al. | |
| 2014/0198021 | A1 | 7/2014 | Tu et al. | |
| 2015/0029201 | A1 | 1/2015 | Cha et al. | |
| 2016/0078846 | A1 | 3/2016 | Liu et al. | |
| 2017/0069256 | A1 | 3/2017 | Seo et al. | |
| 2017/0193971 | A1 * | 7/2017 | Bi | G09G 5/18 |
| 2017/0206840 | A1 | 7/2017 | Cho et al. | |
| 2019/0005884 | A1 | 1/2019 | Yoo | |
| 2019/0096358 | A1 | 3/2019 | Zhao et al. | |
| 2019/0340980 | A1 | 11/2019 | Yum et al. | |
| 2020/0066226 | A1 | 2/2020 | Han et al. | |
| 2020/0082760 | A1 | 3/2020 | Ogata et al. | |
| 2020/0092516 | A1 | 3/2020 | Moon et al. | |
| 2021/0248980 | A1 | 8/2021 | Lee et al. | |
| 2021/0312871 | A1 | 10/2021 | Park et al. | |
| 2022/0051631 | A1 | 2/2022 | Cheon et al. | |
| 2022/0189369 | A1 | 6/2022 | Kim et al. | |
| 2022/0189408 | A1 | 6/2022 | Jo et al. | |
| 2023/0072161 | A1 * | 3/2023 | Lin | G09G 3/2096 |
| 2023/0156265 | A1 | 5/2023 | Park et al. | |
| 2023/0161455 | A1 | 5/2023 | Kim et al. | |
| 2023/0176689 | A1 | 6/2023 | Lee et al. | |
| 2023/0178116 | A1 | 6/2023 | Kim et al. | |
| 2023/0179824 | A1 | 6/2023 | Kim et al. | |
| 2023/0306913 | A1 | 9/2023 | Hatayama et al. | |
| 2024/0038135 | A1 | 2/2024 | Kim et al. | |
| 2024/0038157 | A1 | 2/2024 | Lee et al. | |
| 2024/0112620 | A1 | 4/2024 | Lee et al. | |

FOREIGN PATENT DOCUMENTS

| | | | |
|---|---|---|---|
| JP | 6909903 | B1 | 7/2021 |
| JP | 7387682 | B2 | 11/2023 |
| KR | 20080055653 | A | 6/2008 |
| KR | 20100025095 | A | 3/2010 |
| KR | 101158876 | B1 | 6/2012 |
| KR | 20130027094 | A | 3/2013 |
| KR | 20170064292 | A | 6/2017 |
| KR | 20170087086 | A | 7/2017 |
| KR | 10-2018-0076490 | | 7/2018 |
| KR | 20180076490 | A | 7/2018 |
| KR | 101885331 | B1 | 8/2018 |
| KR | 20180118209 | A | 10/2018 |
| KR | 20190003334 | A | 1/2019 |
| KR | 20190127472 | A | 11/2019 |
| KR | 102223032 | B1 | 2/2021 |
| KR | 20210017468 | A | 2/2021 |
| KR | 20210101679 | A | 8/2021 |
| KR | 102305765 | B1 | 9/2021 |
| KR | 20220006729 | A | 1/2022 |
| KR | 10-2022-0017330 | | 2/2022 |
| KR | 20220015802 | A | 2/2022 |
| KR | 20220021962 | A | 2/2022 |
| KR | 20220048409 | A | 4/2022 |
| KR | 20220081161 | A | 6/2022 |
| KR | 20220082243 | A | 6/2022 |
| KR | 20220088213 | A | 6/2022 |
| KR | 20220104548 | A | 7/2022 |
| KR | 20220113180 | A | 8/2022 |
| KR | 102442662 | B1 | 9/2022 |
| KR | 20220146141 | A | 11/2022 |
| WO | 2019014042 | A1 | 1/2019 |
| WO | 2021164004 | A1 | 8/2021 |

OTHER PUBLICATIONS

Extended European Search Report dated Aug. 21, 2025 issued in European Patent Application No. 23873045.1.
International Search Report for PCT/KR2023/014711 mailed Jan. 11, 2024, 5 pages with English translation.
Written Opinion of the ISA for PCT/KR2023/014711 mailed Jan. 11, 2024, 4 pages.
International Search Report for PCT/KR2023/014940 mailed Jan. 24, 2024, 5 pages with English translation.
Written Opinion of the ISA for PCT/KR2023/014940 mailed Jan. 24, 2024, 3 pages.
International Search Report for PCT /KR2023/015156 mailed Jan. 22, 2024, 5 pages with English translation.
Written Opinion of the ISA for PCT /KR2023/015156 mailed Jan. 22, 2024, 4 pages.
Notice of Allowance for U.S. Appl. No. 18/487,669 mailed Aug. 29, 2024, 18 pages.
Office Action for U.S. Appl. No. 18/488,294 dated Jan. 14, 2025, 28 pages.
Extended European Search Report dated Jul. 3, 2025 issued in European Patent Application No. 23873167.3.

(56) References Cited

OTHER PUBLICATIONS

Notice of Allowance issued May 21, 2025 in corresponding U.S. Appl. No. 18/488,294.

* cited by examiner

ELECTRONIC DEVICE AND METHOD CONTROLLING COMMAND TO DISPLAY

CROSS-REFERENCE TO RELATED APPLICATIONS

This application is a continuation of International Application No. PCT/KR2023/015156 designating the United States, filed on Sep. 27, 2023, in the Korean Intellectual Property Receiving Office and claiming priority to International Application Nos. PCT/KR2023/014940, filed on Sep. 26, 2023 and PCT/KR2023/014711, filed on Sep. 25, 2023, in the Korean Intellectual Property Receiving Office, and to Korean Patent Application Nos. 10-2022-0125365, filed on Sep. 30, 2022, 10-2023-0001471, filed on Jan. 4, 2023, 10-2023-0004350, filed on Jan. 11, 2023, 10-2023-0013290, filed on Jan. 31, 2023, 10-2023-0024329, on Feb. 23, 2023, 10-2023-0026723, filed on Feb. 28, 2023, and 10-2023-0043753, filed on Apr. 3, 2023, in the Korean Intellectual Property Office, the disclosures of each of which are incorporated by reference herein in their entireties.

BACKGROUND

Field

The disclosure relates to an electronic device controlling a command to a display.

Description of Related Art

An electronic device may include a display panel. For example, the electronic device may include display driver circuitry operably coupled to the display panel. For example, the display driver circuitry may display, on the display panel, an image obtained from a processor of the electronic device.

The above-described information may be provided as a related art for the purpose of helping to understand the present disclosure. No claim or determination is made as to whether any of the above-described information may be applied as a prior art related to the present disclosure.

SUMMARY

According to an example embodiment, an electronic device is provided. The electronic device may comprise: at least one processor, comprising processing circuitry; a display including display driver circuitry including a memory, and a display panel wherein at least one processor, individually and/or collectively, may be configured to: obtain a first image to be transmitted from the processor to the display driver circuitry; provide, to the display driver circuitry, in a time interval in an extended vertical front porch of a second vertical synchronization signal for at least one processor, at least one command to be applied to the first image from among the first image and a second image in the memory, wherein the time interval, in the extended vertical front porch of the second vertical synchronization signal for at least one processor, is before a reference time from a start timing of a first vertical synchronization signal for at least one processor; and wherein at least one processor, individually and/or collectively, is configured to, based on the start timing, transmit, to the display driver circuitry, the first image.

According to an example embodiment, a method is provided. The method may be executed in an electronic device comprising a display that includes display driver circuitry including a memory, and a display panel. The method may comprise: obtaining a first image to be transmitted from a processor of the electronic device to the display driver circuitry; providing, to the display driver circuitry, in a time interval in an extended vertical front porch of a second vertical synchronization signal for the processor, at least one command to be applied to the first image from among the first image and a second image in the memory, wherein the time interval, in the extended vertical front porch of the second vertical synchronization signal for the processor, is before a reference time from a start timing of a first vertical synchronization signal for the processor; and based on the start timing, transmitting, to the display driver circuitry, the first image.

According to an example embodiment, an electronic device is provided. The electronic device may comprise: at least one processor, comprising processing circuitry; a display including display driver circuitry including a memory, and a display panel, wherein at least one processor, individually and/or collectively, may be configured to: provide, to the display driver circuitry, in a portion of an extended vertical front porch of a vertical synchronization signal for at least one processor, at least one command, wherein the portion of the extended vertical front porch of the vertical synchronization signal for at least one processor is before a reference time from a timing of an image transmission from at least one processor to the display driver circuitry, wherein at least one processor, individually and/or collectively, may be configured to provide, to the display driver circuitry, at least another command, in the portion of the extended vertical front porch of the vertical synchronization signal and another portion of the extended vertical front porch before the portion of the extended vertical front porch.

According to an example embodiment, a method is provided. The method may be executed in an electronic device comprising a display that includes display driver circuitry including a memory, and a display panel. The method may comprise: providing, to the display driver circuitry, in a portion of an extended vertical front porch of a vertical synchronization signal for a processor of the electronic device, at least one command, wherein the portion of the extended vertical front porch of the vertical synchronization signal for the processor is before a reference time from a timing of an image transmission from the processor to the display driver circuitry; and providing, to the display driver circuitry, at least another command, in the portion of the extended vertical front porch of the vertical synchronization signal and another portion of the extended vertical front porch that is before the portion of the extended vertical front porch.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
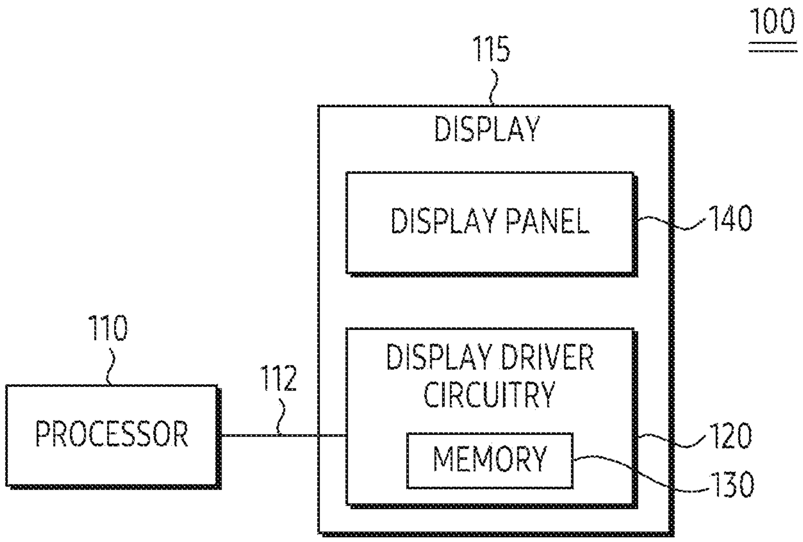
FIG. 1 is a block diagram illustrating an example configuration of an electronic device, according to various embodiments.

FIG. 1 is a block diagram illustrating an example configuration of an electronic device according to various embodiments.

Referring to FIG. 1, an electronic device 100 may include a processor (e.g., including processing circuitry) 110 and a display 115.

Figure 9:
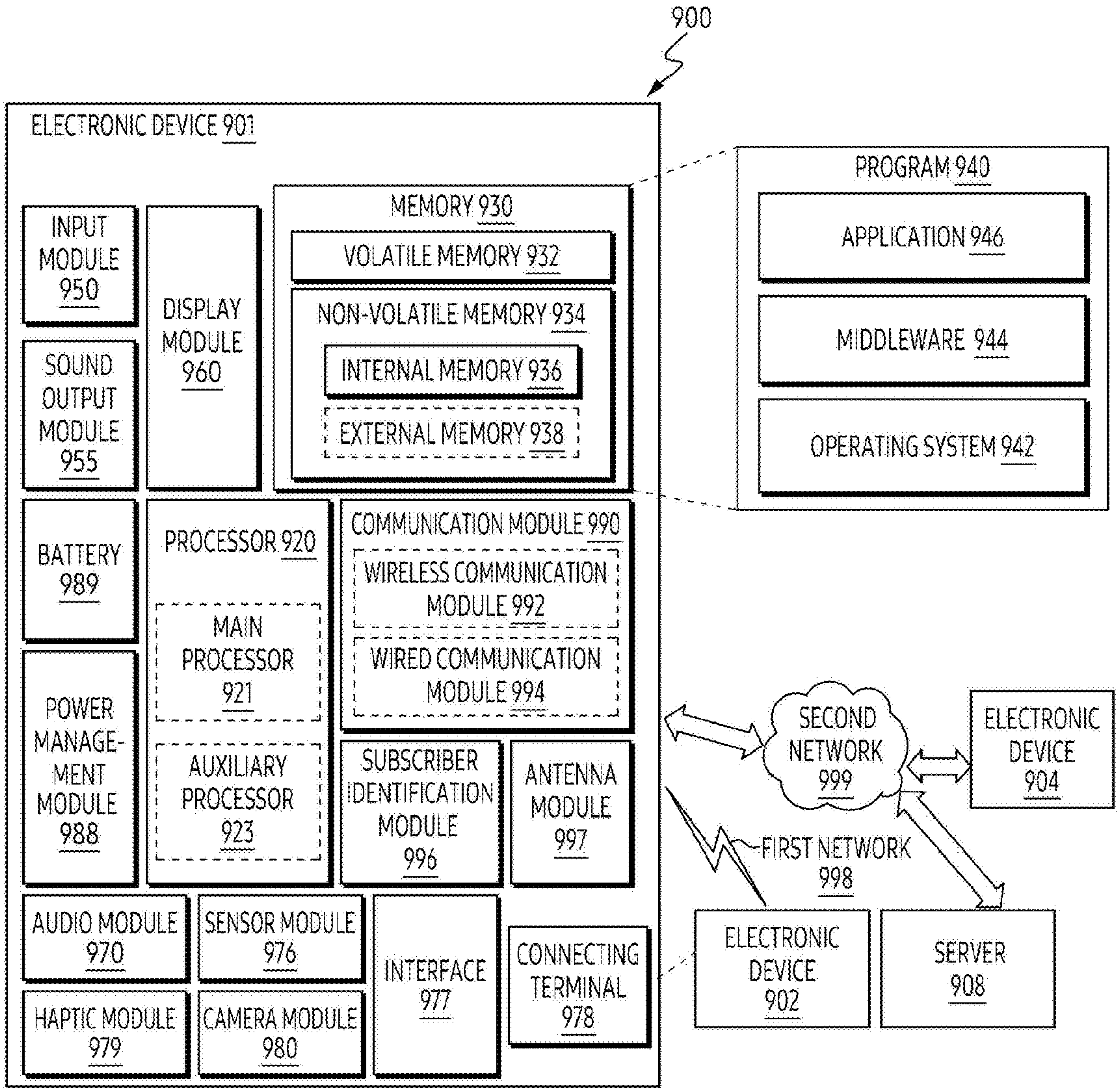
FIG. 9 is a block diagram illustrating an example electronic device in a network environment according to various embodiments.

The processor 110 may include various processing circuitry and may include at least a portion of a processor 920 of FIG. 9. The processor 110 may be operably coupled with display driver circuitry 120 (or the display 115). The processor 110 being operably coupled with the display driver circuitry 120 may indicate that the processor 110 is directly or indirectly connected with the display driver circuitry 120. For example, the processor 110 being operably coupled with the display driver circuitry 120 may indicate that the processor 110 is connected with the display driver circuitry 120 through an interface 112 (e.g., a mobile industry processor interface (MIPI)) for an image transmission from the processor 110 to the display driver circuitry 120. For example, the interface 112 may be further used to provide commands related to display on a display panel 140 from the processor 110 to the display driver circuitry 120. For example, the processor 110 being operably coupled with the display driver circuitry 120 may indicate that the processor 110 is connected with the display driver circuitry 120 through at least one interface for at least one signal for synchronizing at least a portion of operations of the processor 110 related to display and at least a portion of operations of the display driver circuitry 120 related to display. For example, the at least one interface may be included in the interface 112 or may be separated from the interface 112. The processor 110 may various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Figure 10:
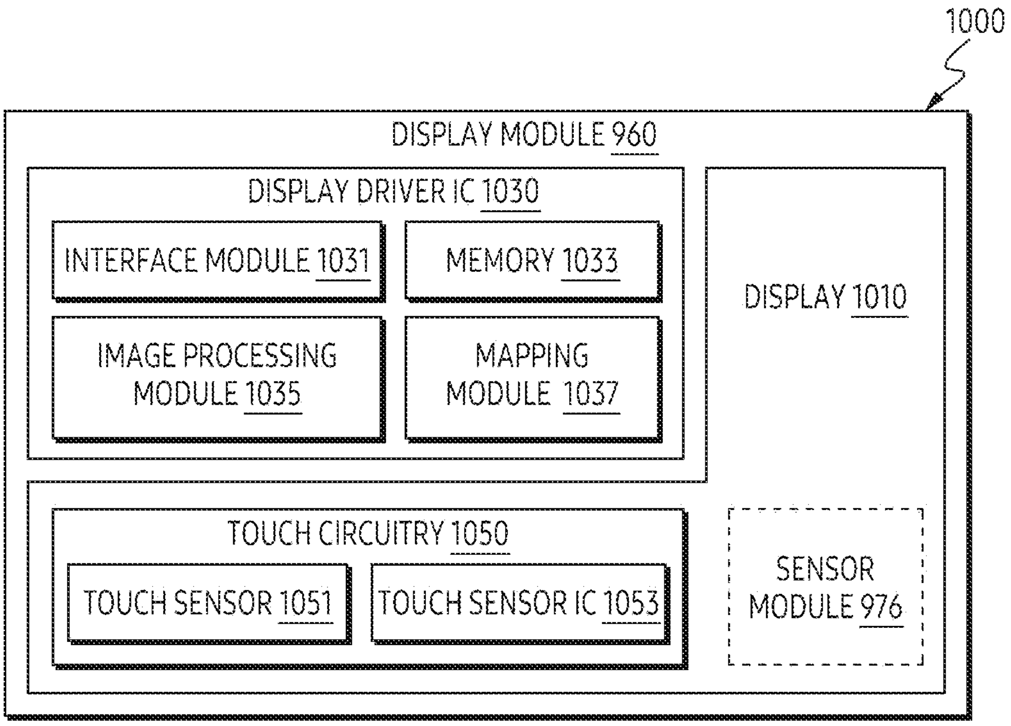
FIG. 10 is a block diagram illustrating an example configuration of a display module according to various embodiments.

The display 115 may include at least a portion of a display module 960 of FIGS. 9 and 10. The display 115 may include display driver circuitry 120 and a display panel 140.

The display driver circuitry 120 may include at least a portion of a DDI 1030 of FIG. 10. The display driver circuitry 120 may include a memory 130. The memory 130 may include at least a portion of a memory 1033 of FIG. 10. The memory 130 may be referred to as a graphic random access memory (GRAM) or a frame buffer memory.

The display panel 140 may include at least a portion of a display 1010 of FIG. 10.

Each of the processor 110, the interface 112 for the image transmission, and the display driver circuitry 120 may be configured for a first mode and/or a second mode.

The first mode may indicate a mode of executing the image transmission based on a timing identified by the processor 110 (or timing for the processor 110). For example, the first mode may be a video mode of a mobile industry processor interface (MIPI) display serial interface (DSI) or a mode similar to the video mode. As a non-limiting example, the first mode may be partially different from the video mode. As a non-limiting example, it may be optional to store, in the memory 130, an image received from the processor 110 through the interface 112 according to the image transmission executed based on the first mode. For example, storing the image in the memory 130 in the first mode may be executed to reduce occurrence of afterimages on the display panel 140 or occurrence of blinking on the display panel 140. As a non-limiting example, a throughput of the image transmission executed based on the first mode may be less than a throughput of the image transmission executed based on the second mode. As a non-limiting example, a vertical sync start (VSS) packet may be provided to the display driver circuitry 120 to indicate the image transmission executed for the first mode before the image transmission executed for the first mode.

The second mode may indicate a mode of executing an image transmission from the processor 110 to the display driver circuitry 120 through the interface 112 based on a timing identified by the display driver circuitry 120 (or timing for the display driver circuitry 120). For example, the second mode may be a command mode of MIPI DSI. As a non-limiting example, it may be mandatory to store, in the memory 130, an image received from the processor 110 through the interface 112 according to the image transmission executed based on the second mode. As a non-limiting example, a throughput of the image transmission executed based on the second mode may be greater than a throughput of the image transmission executed based on the first mode. For example, the image transmission executed based on the second mode may be a data burst transmission, unlike the image transmission executed based on the first mode. As a non-limiting example, the second mode may be a mode for always on display (AOD). As a non-limiting example, a 2ch command may be provided to the display driver circuitry 120 to indicate the image transmission executed for the second mode before the image transmission executed for the second mode.

As a non-limiting example, the first mode may be changed to the second mode, and the second mode may be changed to the first mode.

For example, the display driver circuitry 120 may re-display, based on scanning an image stored in the memory 130, the image on the display panel 140. For example, the re-display of the image may be executed to maintain display on the display panel 140. For example, the re-display of the image may be executed to reduce occurrence of an afterimage on the display panel 140. For example, the re-display of the image may be executed to reduce occurrence of blinking on the display panel 140.

For example, the re-display of the image executed by the display driver circuitry 120 may be transparent to the processor 110. For example, since the re-display of the image is executed while the image transmission from the processor 110 to the display driver circuitry 120 is not being executed, the processor 110 may not recognize or identify the re-display of the image. As a non-limiting example, the processor 110 may be in a sleep state different from a wake-up state while the re-display of the image is being executed.

The processor 110 may provide a command to the display driver circuitry 120 to control display on the display panel 140. For example, the display driver circuitry 120 may execute display on the display panel 140, based on the command obtained from the processor 110.

For example, the processor 110 may provide the display driver circuitry 120 with at least one command for display on the display panel 140. For example, the at least one command may be provided for an image to be transmitted from the processor 110 to the display driver circuitry 120. For example, the at least one command may be applied to at least one targeted image. For example, the at least one targeted image may include the image to be transmitted from the processor 110 to the display driver circuitry 120 and/or at least one image to be transmitted to the display driver circuitry 120 after the image is transmitted to the display driver circuitry 120. For example, when the at least one command is applied to at least another image that is distinct from (or different from) the at least one targeted image, malfunction may occur within the display 115 or a quality of a service provided through the display 115 may be reduced. For example, it may be mandatory to transmit to the display driver circuitry 120 a targeted image to which the at least one command will be applied after the at least one command is transmitted.

For example, the processor 110 may provide the display driver circuitry 120 with at least another command for display on the display panel 140. For example, the at least another command may be provided regardless of the at least one targeted image (or independently of the at least one targeted image). For example, the at least another command may be applied to any image. For example, the at least another command is not targeted to a specific image, so even if the at least another command is applied to an arbitrary image, the malfunction and/or a decrease in the quality of the service may not be caused. For example, transmitting an image to the display driver circuitry 120 after the at least another command is transmitted may be optional.

As a non-limiting example, the at least one command may be used to change a refresh rate. For example, the at least one command may indicate activating of the memory 130 (or deactivating of the memory 130), a target refresh rate, a maximum refresh rate, a minimum refresh rate, and/or a timing of scanning for display on the display panel 140.

As a non-limiting example, the at least one command may be used to change the first mode to the second mode. For example, the at least one command may indicate a change (or transition) from the first mode to the second mode, a target refresh rate provided in the second mode, a maximum refresh rate provided in the second mode, a minimum refresh rate provided in the second mode, and/or a timing of scanning for display on the display panel 140 in the second mode.

As a non-limiting example, the at least one command may be used to change the second mode to the first mode. For example, the at least one command may indicate a change (or transition) from the second mode to the first mode, a target refresh rate provided in the first mode, a maximum refresh rate provided in the first mode, and/or a timing of scanning for display on the display panel 140 in the first mode.

As a non-limiting example, the at least one command may be used to change the first mode to the second mode for low power (e.g., hybrid low power mode (HLPM)). For example, the at least one command indicates a target refresh rate provided in the second mode for the low power, a maximum refresh rate provided in the second mode for the low power, and/or a minimum refresh rate provided in the second mode for the low power.

As a non-limiting example, the at least one command may be used to change the second mode for the low power to the first mode. For example, the at least one command may indicate a target refresh rate in the first mode changed from the second mode for the low power, a maximum refresh rate in the first mode changed from the second mode for the low power, and/or a minimum refresh rate in the first mode changed from the second mode for the low power.

As a non-limiting example, the at least another command may be used to change a brightness level of an image displayed on the display panel 140. For example, the at least another command may indicate a target brightness level of an image displayed on the display panel 140 when changing a refresh rate, changing the first mode to the second mode, or changing the second mode to the first mode. As a non-limiting example, the at least another command may be used to change a gamma curve used for display on the display panel 140. As a non-limiting example, the at least another command may be used to cancel or delay the at least one command. For example, the at least another command may be used to cancel or delay executing operations for re-display of an image based on the at least one command. For example, the at least another command may be used to cancel or delay executing operations to reduce occurrence of an afterimage on the display panel 140 based on the at least one command. For example, the at least another command may be used to cancel or delay use of at least one intermediate frequency for changing from a first frequency to a second frequency based on the at least one command. For example, the at least another command may be used to cancel or delay executing operations to reduce occurrence of blinking on the display panel 140 based on the at least one command. For example, the at least another command may be used to cancel or delay changing a refresh rate on the display panel 140 to a minimum refresh rate based on the at least one command. For example, the at least another command may be used to change a location or an image to which the at least one command will be applied. However, the disclosure is not limited thereto.

As described above, since the re-display of the image executed by the display driver circuitry 120 is transparent to the processor 110, the at least one command may be provided from the processor 110 to the display driver circuitry 120 while the re-display of the image is being executed. For example, the at least one command provided from the processor 110 to the display driver circuitry 120 while the re-display of the image is being executed may be applied to the image, which is different from a targeted image related to the at least one command. For example, since applying the at least one command to the image causes a decrease in the quality of the service and/or the malfunction, the processor 110 may provide the display driver circuitry 120 with the at least one command, in another time interval different from (or distinct from) a time interval during which the re-display of the image may be executed.

A method of providing the at least one command and a method of providing the at least another command may be described in greater detail below with reference to FIGS. 2, 3 and 4.

Figure 2:
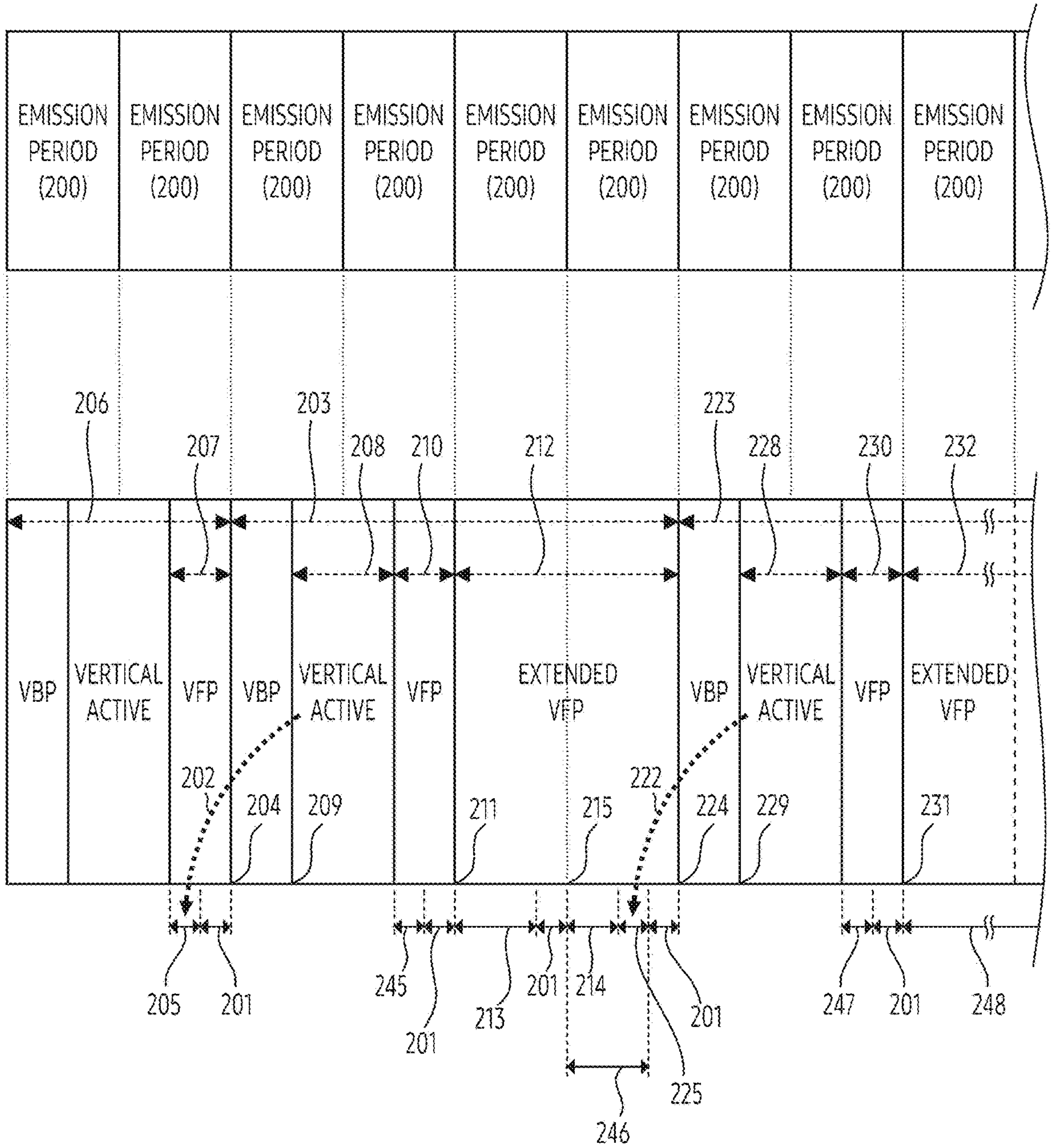
FIG. 2 is a diagram illustrating an example method of providing display driver circuitry with at least one command and at least another command while executing an image transmission based on an emission synchronization signal for a processor in a first mode according to various embodiments.

FIG. 2 is a diagram illustrating an example method of providing display driver circuitry with at least one command and at least another command while executing an image transmission based on an emission synchronization signal for a processor in a first mode according to various embodiments.

Referring to FIG. 2, a processor 110 may execute an image transmission from the processor 110 to display driver circuitry 120, in the first mode, based on an emission synchronization signal for the processor 110 indicating an emission period 200 (or start timing of the emission period 200) of the display driver circuitry 120. For example, in the first mode, the display driver circuitry 120 may execute display on the display panel 140, based on the emission synchronization signal for the display driver circuitry 120. For example, a period of the emission synchronization signal may be shorter than a period of the vertical synchronization signal for the processor 110. For example, a time interval of the emission synchronization signal may be shorter than a time interval of the vertical synchronization signal for the processor 110. For example, a portion of start timings of the emission period 200 indicated by the emission synchronization signal may respectively overlap start timings of the vertical synchronization signal for the processor 110, and another portion (or remaining portion) of start timings of the emission period 200 indicated by the emission synchronization signal may be between the start timings of the vertical synchronization signal.

For example, the processor 110 may provide the display driver circuitry 120 with the at least one command before a targeted image to which the at least one command is applied is transmitted to the display driver circuitry 120.

For example, the processor 110 may provide the display driver circuitry 120 with the at least one command to be applied to a targeted image, in a time interval in a vertical front porch (or extended vertical front porch) of a second vertical synchronization signal for the processor 110, wherein the time interval in the vertical front porch (or extended vertical front porch) of the second vertical synchronization signal for the processor 110 is before a reference time 201 from a start timing of a first vertical synchronization signal for the processor 110 used to transmit the targeted image to the display driver circuitry 120. For example, the reference time 201 may be defined, configured, or set for a time consumed to apply the at least one command to the targeted image.

For example, the processor 110 may provide the display driver circuitry 120 with the at least one command for the first targeted image, in a time interval 205 being before a reference time 201 from a start timing 204 of a vertical synchronization signal 203 used to transmit a first targeted image to the display driver circuitry 120, as indicated by arrow 202. For example, the time interval 205 may be included in a vertical front porch 207 (e.g., vertical front porch (VFP)) of a vertical synchronization signal 206 being before the vertical synchronization signal 203. For example, the time interval 205 may have a reference length. For example, the reference length may be identical to a length obtained by subtracting the reference time 201 from a length of the vertical front porch 207, as illustrated in FIG. 2. However, the disclosure is not limited thereto. For example, the reference length may be shorter than a length obtained by subtracting the reference time 201 from the length of the vertical front porch 207.

For example, the processor 110 may provide the display driver circuitry 120 with the at least one command in the time interval 205, and then transmit the first targeted image to the display driver circuitry 120 based on the start timing 204. For example, the processor 110 may provide the display driver circuitry 120 with the at least one of the commands in the time interval 205, transmit a vertical sync start (VSS) packet indicating transmission of the first targeted image to the display driver circuitry 120 at the start timing 204, and transmit the first targeted image to the display driver circuitry 120 at a start timing 209 of a vertical active 208 of the vertical synchronization signal 203 (or an end timing 209 of a vertical back porch (VBP)). For example, the display driver circuitry 120 may display the first targeted image on the display panel 140, based on applying the at least one command obtained in the time interval 205 to the first targeted image received at the start timing 209.

For example, the processor 110 may extend the vertical synchronization signal 203 while a newly obtained image after transmitting the first targeted image based on the start timing 204 is not present. For example, until a new image is obtained, the processor 110 may obtain an extended vertical front porch (extended VFP) 212 of the vertical synchronization signal 203 being initiated from an end timing 211 of a vertical front porch (VFP) 210 of the vertical synchronization signal 203. For example, a length of the extended vertical front porch 212 may be a multiple of the emission period 200.

As a non-limiting example, the display driver circuitry 120 may store the first targeted image received from the start timing 209 in the memory 130. For example, since the extended vertical front porch 212 includes the emission periods 200 (e.g., two emission periods 200), the display driver circuitry 120 may re-display the first targeted image by scanning the first targeted image stored in the memory 130 within the extended vertical front porch 212.

For example, since the re-display of the first targeted image is executed within the extended vertical front porch 212 in which an image transmission from the processor 110 to the display driver circuitry 120 is not executed, the re-display of the first targeted image may be transparent to the processor 110.

For example, the processor 110 may obtain a second targeted image (e.g., an image to be displayed based on a vertical synchronization signal 223) and identify the at least one command for the second targeted image. For example, since the re-display of the first targeted image is transparent to the processor 110, the at least one command for the second targeted image when transmitted from the processor 110 to the display driver circuitry 120 may be applied to the first targeted image, in a portion of a time interval 213 (e.g., a time interval from the start timing 211 of the emission period 200) within the vertical front porch 212 in which the at least one command for the second targeted image is extended and/or a time interval 214 (e.g., a time interval from a start timing 215 of the emission period 200) within the extended vertical front porch 212. Since applying the at least one command for the second targeted image to the first targeted image may cause a decrease in the quality of the service or the malfunction, the processor 110 may refrain from, delay, or bypass providing the display driver circuitry 120 with the at least one command, in at least one time interval (e.g., a portion of the time interval 213 and the time interval 214) within the extended vertical front porch 212 in which the re-display of the first targeted image may be executed.

For example, the processor 110 may provide the display driver circuitry 120 with the at least one command in a time interval 225 within the extended vertical front porch 212, in order to apply the at least one command to the second targeted image among the first targeted image stored in the memory 130 and the second targeted image to be transmitted to the display driver circuitry 120 as indicated by arrow 222. For example, the time interval 225 may be a time interval within the extended vertical front porch 212 in which the re-display of the first targeted image cannot be executed. For example, the time interval 225 may be after scanning of the first targeted image in the memory 130 for the re-display of the first targeted image is terminated. For example, the time interval 225 may be before a reference time 201 from a start timing 224 of the vertical synchronization signal 223 for the processor 110 used to transmit the second targeted image. For example, the time interval 225 may be between an end timing of scanning of the first targeted image and a timing before the reference time 201 from the start timing 224. For example, a length of the time interval 225 may correspond to a length of the time interval 205.

For example, the processor 110 may provide the display driver circuitry 120 with the at least one command in the time interval 225, and then transmit the second targeted image to the display driver circuitry 120 based on the start timing 224. For example, the processor 110 may provide the display driver circuitry 120 with the at least one command in the time interval 225, transmit a VSS packet indicating a transmission of the second targeted image to the display driver circuitry 120 at the start timing 224, and transmit the second targeted image to the display driver circuitry 120 at a start timing 229 of a vertical active 228 of the vertical synchronization signal 223. For example, the display driver circuitry 120 may display the second targeted image on the display panel 140, based on applying the at least one command obtained in the time interval 225 to the second targeted image received at the start timing 229.

For example, the processor 110 may extend the vertical synchronization signal 223 while a newly obtained image after transmitting the second targeted image based on the start timing 224 is not present. For example, until a new image is obtained, the processor 110 may obtain an extended vertical front porch 232 of the vertical synchronization signal 223 being initiated from an end timing 231 of a vertical front porch 230 of the vertical synchronization signal 223. Although not explicitly illustrated in FIG. 2, a length of the extended vertical front porch 232 may be a multiple of the emission period 200.

For example, the processor 110 may provide the display driver circuitry 120 with the at least another command that does not have a targeted image (or may be applied to any image). For example, the at least another command may be provided to the display driver circuitry 120 within a vertical front porch (or extended vertical front porch) of a vertical synchronization signal for the processor 110. For example, the at least another command may be provided to the display driver circuitry 120, within a time interval being before a reference time 201 from an end timing of the vertical front porch. For example, since the at least another command is independent of an image transmission, the at least another command may be provided to the display driver circuitry 120 in a time interval being before the reference time 201 from an end timing of the vertical front porch of the vertical synchronization signal being before the extended vertical front porch of the vertical synchronization signal. For example, the amount of time resources used to provide the at least another command may be greater than the amount of time resources used to provide the at least one command.

For example, the processor 110 may provide the display driver circuitry 120 with the at least another command, within the time interval 205 being before a reference time 201 from a start timing 204 of a vertical synchronization signal 203. For example, the processor 110 may provide the at least another command to the display driver circuitry 120, in a time interval 245 being before a reference time 201 from an end timing 211 of a vertical front porch 210 being before an extended vertical front porch 212. For example, the processor 110 may provide the display driver circuitry 120 with the at least another command, in a time interval 213 being before a reference time 201 from a start timing 215. For example, the processor 110 may provide the display driver circuitry 120 with the at least another command, in a time interval 246 being before a reference time 201 from a start timing 224. For example, a portion of the time interval 246 may overlap the time interval 225 capable of providing the at least one command. For example, the processor 110 may provide the at least another command to the display driver circuitry 120, in a time interval 247 being before a reference time 201 from an end timing 231 of a vertical front porch 230 being before an extended vertical front porch 232. For example, the processor 110 may provide the display driver circuitry 120 with the at least another command in a time interval 248. For example, the time interval 248 may be within a portion of the extended vertical front porch 232.

As described above, the processor 110 may execute transmitting the at least one command to the display driver circuitry 120, before an image to which the at least one command will be applied is transmitted. For example, the electronic device 100 including the processor 110 may provide an enhanced service through the display 115.

Figure 3:
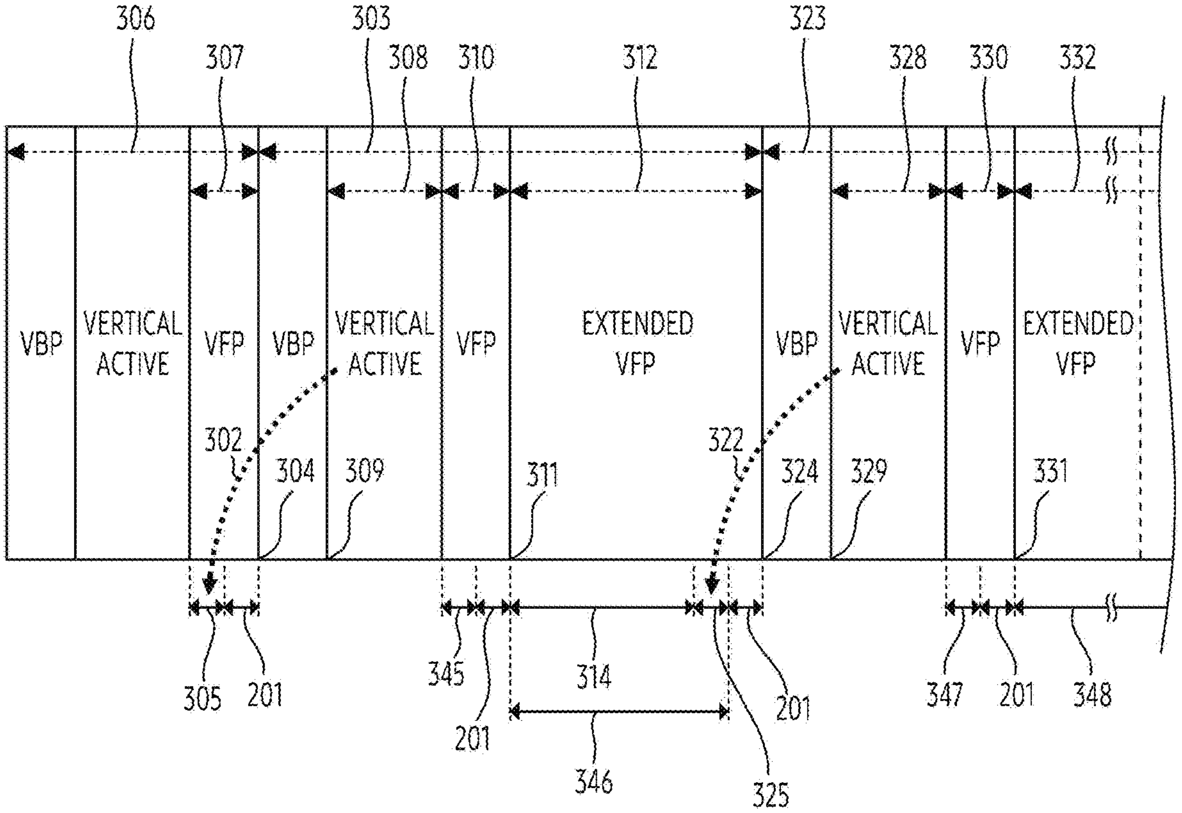
FIG. 3 is a diagram illustrating an example method of providing display driver circuitry with at least one command and at least another command while executing an image transmission based on a vertical synchronization signal for a processor in a first mode according to various embodiments.

FIG. 3 is a diagram illustrating an example method of providing display driver circuitry with at least one command and at least another command while executing an image transmission based on a vertical synchronization signal for a processor in a first mode according to various embodiments.

Referring to FIG. 3, the processor 110 may execute an image transmission from the processor 110 to the display driver circuitry 120, based on a vertical synchronization signal for the processor 110 in the first mode. For example, in the first mode, the display driver circuitry 120 may execute display on the display panel 140, based on the vertical synchronization signal for the display driver circuitry 120. As a non-limiting example, a refresh rate executing the image transmission based on the vertical synchronization signal may be lower than a refresh rate executing the image transmission based on the emission synchronization signal.

For example, the processor 110 may provide the display driver circuitry 120 with the at least one command, before a targeted image to which the at least one command will be applied is transmitted to the display driver circuitry 120.

For example, the processor 110 may provide the display driver circuitry 120 with the at least one command to be applied to the targeted image, in a time interval within a vertical front porch (or extended vertical front porch) of a second vertical synchronization signal for the processor 110 that is before a reference time 201 from a start timing of a first vertical synchronization signal for the processor 110 used to transmit the targeted image to the display driver circuitry 120. For example, the reference time 201 may be defined, configured, or set for a time consumed to apply the at least one command to the targeted image. As a non-limiting example, a time interval that provides the at least one command while the image transmission is executed based on the vertical synchronization signal for the processor 110 may correspond to a time interval that provides the at least one command while the image transmission is executed based on the emission synchronization signal for the processor 110.

For example, the processor 110 may provide the display driver circuitry 120 with the at least one command for the first targeted image, in a time interval 305 being before a reference time 201 from a start timing 304 of a vertical synchronization signal 303 used to transmit a first targeted image to the display driver circuitry 120, as indicated by arrow 302. For example, the time interval 305 may be included within a vertical front porch (e.g., VFP) 307 of a vertical synchronization signal 306 being before the vertical synchronization signal 303. As a non-limiting example, a length of the time interval 305 may correspond to a length of the time interval 205 of FIG. 2.

For example, the processor 110 may provide the display driver circuitry 120 with the at least one command within the time interval 305, and then transmit the first targeted image to the display driver circuitry 120 based on the start timing 304. For example, the processor 110 may provide the at least one command to the display driver circuitry 120 within the time interval 305, transmit a vertical sync start (VSS) packet indicating transmission of the first targeted image to the display driver circuitry 120 at the start timing 304, and transmit the first targeted image to the display driver circuitry 120 at a start timing 309 of a vertical active 308 of the vertical synchronization signal 303 (or an end timing 309 of a vertical back porch (VBP)). For example, the display driver circuitry 120 may display the first targeted image on the display panel 140, based on applying the at least one command obtained within the time interval 305 to the first targeted image received at the start timing 309.

For example, the processor 110 may extend the vertical synchronization signal 303, while a newly obtained image after transmitting the first targeted image based on the start timing 304 is not present. For example, until a new image is obtained, the processor 110 may obtain an extended vertical front porch (extended VFP) 312 of the vertical synchronization signal 303 being initiated from an end timing 311 of a vertical front porch (VFP) 310 of the vertical synchronization signal 303.

As a non-limiting example, the display driver circuitry 120 may store the first targeted image received from the start timing 309 in the memory 130. For example, the display driver circuitry 120 may re-display the first targeted image by scanning the first targeted image stored in the memory 130 in the extended vertical front porch 312.

For example, since the re-display of the first targeted image is executed in the extended vertical front porch 312 in which an image transmission from the processor 110 to the display driver circuitry 120 is not executed, the re-display of the first targeted image may be transparent to the processor 110.

For example, the processor 110 may obtain a second targeted image (e.g., an image to be displayed based on a vertical synchronization signal 323) and identify the at least one command for the second targeted image. For example, since the re-display of the first targeted image is transparent to the processor 110, the at least one command for the second targeted image when transmitted from the processor 110 to the display driver circuitry 120 may be applied to the first targeted image, in a time interval 314 within the vertical front porch 312 in which the at least one command for the second targeted image is extended. Since applying the at least one command for the second targeted image to the first targeted image may cause a decrease in the quality of the service or the malfunction, the processor 110 may refrain from, delay, or bypass providing the at least one command to the display driver circuitry 120 in a time interval 314 within the extended vertical front porch 312 during which the re-display of the first targeted image may be executed.

For example, the processor 110 may provide the display driver circuitry 120 with the at least one command in a time interval 325 within the extended vertical front porch 312, in order to apply the at least one command to the second targeted image among the first targeted image stored in the memory 130 and the second targeted image to be transmitted to the display driver circuitry 120, as indicated by arrow 322. For example, the time interval 325 may be a time interval within extended vertical front porch 312 in which the re-display of the first targeted image cannot be executed. For example, the time interval 325 may be after scanning of the first targeted image in the memory 130 for the re-display of the first targeted image is terminated. For example, the time interval 325 may before a reference time 201 from a start timing 324 of a vertical synchronization signal 323 for the processor 110 used to transmit the second targeted image. For example, the time interval 325 may be between an end timing of scanning of the first targeted image and a timing before a reference time 201 from the start timing 324. For example, a length of the time interval 325 may correspond to a length of the time interval 305.

For example, the processor 110 may provide the display driver circuitry 120 with the at least one command in the time interval 325, and then transmit the second targeted image to the display driver circuitry 120 based on the start timing 324. For example, the processor 110 may provide the at least one command in the time interval 325 to the display driver circuitry 120, transmit a VSS packet indicating a transmission of the second targeted image to the display driver circuitry 120 at the start timing 324, and transmit the second targeted image to the display driver circuitry 120 at a start timing 329 of a vertical active 328 of the vertical synchronization signal 323. For example, the display driver circuitry 120 may display the second targeted image on the display panel 140, based on applying the at least one command obtained in the time interval 325 to the second targeted image received at the start timing 329.

For example, the processor 110 may extend the vertical synchronization signal 323 while a newly obtained image after transmitting the second targeted image based on the start timing 324 is not present. For example, until a new image is obtained, the processor 110 may obtain an extended vertical front porch 332 of the vertical synchronization signal 323 being initiated from an end timing 331 of a vertical front porch 330 of the vertical synchronization signal 323.

For example, the processor 110 may provide the display driver circuitry 120 with the at least another command that does not have a targeted image (or may be applied to any image). For example, the at least another command may be provided to the display driver circuitry 120 within a vertical front porch (or extended vertical front porch) of a vertical synchronization signal for the processor 110. For example, the at least another command may be provided to the display driver circuitry 120 within a time interval being before a reference time 201 from an end timing of the vertical front porch. For example, since the at least another command is independent of image transmission, the at least another command may be provided to the display driver circuitry 120 in a time interval being before the reference time 201 from an end timing of the vertical front porch of the vertical synchronization signal being before the extended vertical front porch of the vertical synchronization signal. For example, the amount of time resources used to provide the at least another command may be greater than the amount of time resources used to provide the at least one command.

For example, the processor 110 may provide the display driver circuitry 120 with the at least another command, within the time interval 305 being before a reference time 201 from a start timing 304 of a vertical synchronization signal 303. For example, the processor 110 may provide the at least another command to the display driver circuitry 120, in a time interval 345 being before a reference time 201 from an end timing 311 of a vertical front porch 310 being before an extended vertical front porch 312. For example, the processor 110 may provide the display driver circuitry 120 with the at least another command, in a time interval 346 being before a reference time 201 from a start timing 324. For example, since the display driver circuitry 120 executes display on the display panel 140 based on the vertical synchronization signal, a length of the time interval 314 capable of providing the at least another command within the extended vertical front porch 312 may be longer than a length of a time interval capable of providing the at least one command within the extended vertical front porch 212 of FIG. 2. For example, a portion of the time interval 346 may overlap the time interval 325 capable of providing the at least one command. For example, the processor 110 may provide the display driver circuitry 120 with the at least another command, in a time interval 347 being before the reference time 201 from the end timing 331 of the vertical front porch 330 being before the extended vertical front porch 332. For example, the processor 110 may provide the display driver circuitry 120 with the at least another command within a time interval 348. For example, the time interval 348 may be within a portion of the extended vertical front porch 332.

As described above, the processor 110 may execute transmitting the at least one command to the display driver circuitry 120 before an image to which the at least one command is to be applied is transmitted. For example, the electronic device 100 including the processor 110 may provide an enhanced service through the display 115.

Figure 4:
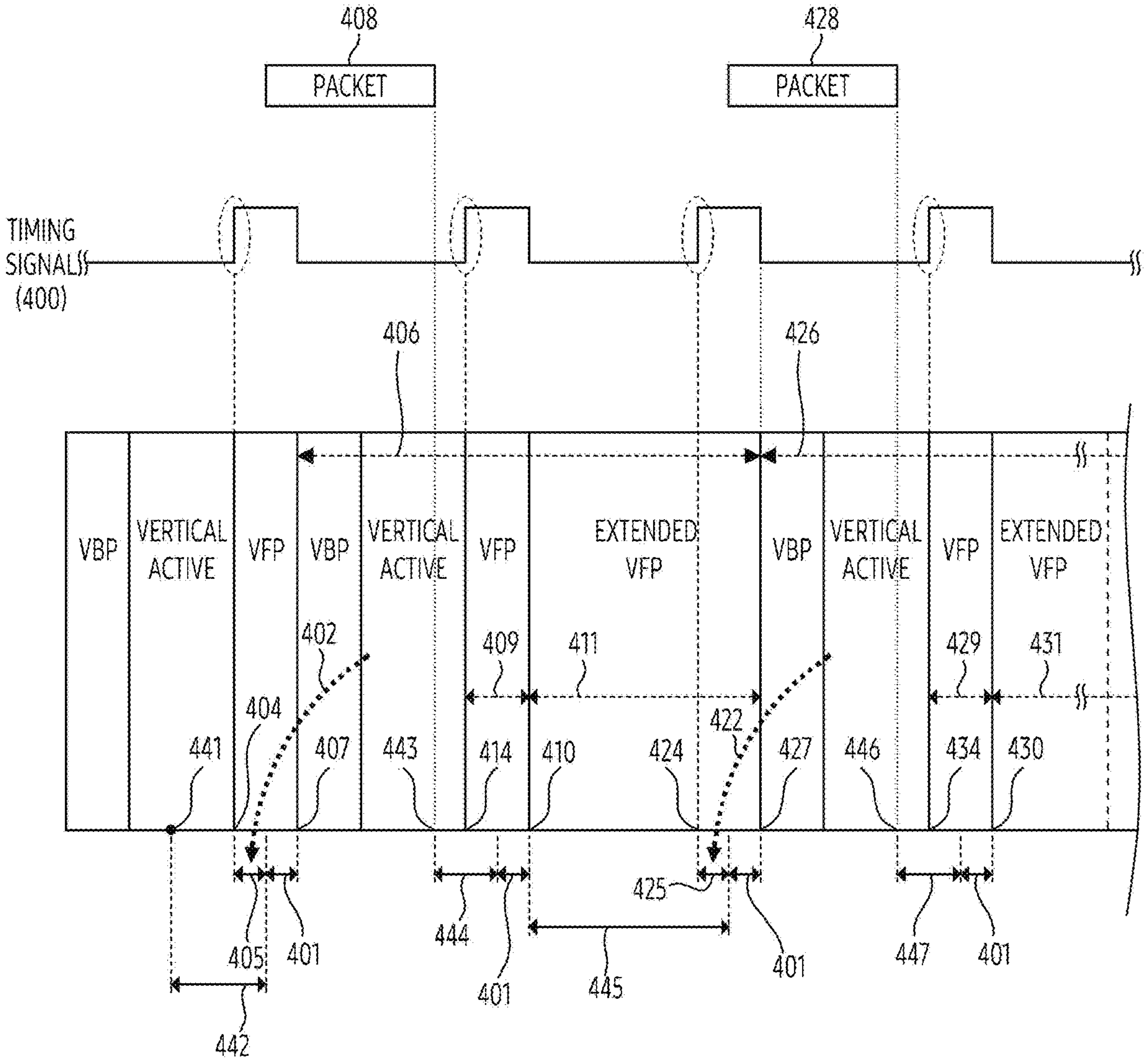
FIG. 4 is a diagram illustrating an example method of providing display driver circuitry with at least one command and at least another command while executing an image transmission in a second mode according to various embodiments.

FIG. 4 is a diagram illustrating an example method of providing display driver circuitry with at least one command and at least another command while executing an image transmission in a second mode according to various embodiments.

Referring to FIG. 4, the processor 110 may execute an image transmission from the processor 110 to the display driver circuitry 120, within the second mode, based on a timing indicated by a timing signal (e.g., tearing effect (TE) signal) provided from the display driver circuitry 120 to the processor 110. For example, the display driver circuitry 120 may store an image received from the processor 110 in the memory 130 according to the image transmission and display the image on the display panel 140 by scanning the image stored in the memory 130.

For example, the processor 110 may provide the display driver circuitry 120 with the at least one command to be applied to a targeted image, based on the timing signal. As a non-limiting example, the at least one command may be provided to the display driver circuitry 120 within a time interval being before another reference time 401 from a start timing of a vertical synchronization signal for the processor 110 (e.g., vertical synchronization signal for the targeted image) indicated by the timing signal. For example, a length of the another reference time 401 may be identical to a length of the reference time 201 or may be different from the length of the reference time 201. For example, a length of the time interval may be identical to or different from a length of each of the time interval 205 of FIG. 2, the time interval 225 of FIG. 2, the time interval 305 of FIG. 3, and the time interval 325 of FIG. 3. As a non-limiting example, the length of the time interval may be identical to or different from a length of each of the time interval 247 of FIG. 2 and the time interval 347 of FIG. 3.

For example, the display driver circuitry 120 may provide the processor 110 with a timing signal 400 at a timing 404. For example, the processor 110 may provide the display driver circuitry 120 with the at least one command to be applied to a first targeted image based on the timing signal 400 obtained at the timing 404, as indicated by arrow 402. For example, the processor 110 may provide the at least one command within a time interval 405 from the timing 404. For example, the time interval 405 may be before a start timing 407 of a vertical synchronization signal 406 for the processor 110 used for the first targeted image. As a non-limiting example, the time interval 405 may be before the reference time 401 from the start timing 407.

For example, the processor 110 may transmit a packet 408 including the first targeted image to the display driver circuitry 120 according to the start timing 407, based on the timing signal 400 obtained at the timing 404. For example, the display driver circuitry 120 may store the first targeted image within the packet 408 in the memory 130 and display the first targeted image on the display panel 140 by scanning the first targeted image in the memory 130. For example, a 2ch command may be received from the processor 110 before the first targeted image is received.

For example, the display driver circuitry 120 may provide the processor 110 with the timing signal 400 at a timing 414. For example, since a new image obtained by the processor 110 does not exist, executing an image transmission based on the timing signal 400 obtained at the timing 414 may be bypassed or skipped. For example, the processor 110 may extend the vertical synchronization signal 406 until the timing signal 400 is obtained again from the display driver circuitry 120 after a new image is obtained. For example, the processor 110 may obtain an extended vertical front porch 411 of the vertical synchronization signal 406 from an end timing 410 of a vertical front porch 409 of the vertical synchronization signal 406, until the timing signal 400 is obtained again from the display driver circuitry 120 after a new image is obtained.

For example, after a second targeted image, which is the new image, is obtained by the processor 110 and the at least one command to be applied to the second targeted image is identified by the processor 110, the display driver circuitry 120 may provide the timing signal 400 to the processor 110 at a timing 424. For example, the processor 110 may provide the display driver circuitry 120 with the at least one command to be applied to the second targeted image based on the timing signal 400 obtained at the timing 424, as indicated by arrow 422. For example, the processor 110 may provide the at least one command within a time interval 425 from the timing 424. For example, the time interval 425 may be before a start timing 427 of a vertical synchronization signal 426 for the processor 110 used for the second targeted image. As a non-limiting example, the time interval 425 may be before the reference time 401 from the start timing 427.

For example, the processor 110 may transmit a packet 428 including the second targeted image to the display driver circuitry 120 according to the start timing 427, based on the timing 400 obtained at the timing 424. For example, the display driver circuitry 120 may store the second targeted image in the packet 428 in the memory 130 and display the second targeted image on the display panel 140 by scanning the second targeted image in the memory 130. For example, a 2ch command may be received from the processor 110 before the second targeted image is received.

For example, the display driver circuitry 120 may provide the processor 110 with a timing signal 400 at a timing 434. For example, since a new image obtained by the processor 110 does not exist, executing an image transmission based on the timing signal 400 obtained at the timing 434 may be bypassed or skipped. For example, the processor 110 may extend the vertical synchronization signal 426 until the timing signal 400 is obtained again from the display driver circuitry 120 after a new image is obtained. For example, the processor 110 may obtain an extended vertical front porch 431 of the vertical synchronization signal 426 from an end timing 430 of a vertical front porch 429 of the vertical synchronization signal 426, until the timing signal 400 is obtained again from the display driver circuitry 120 after a new image is obtained.

For example, the processor 110 may provide the display driver circuitry 120 with the at least another command that does not have a targeted image from a timing at which a reception of a packet including an image is terminated (or completed). As a non-limiting example, the at least another command may be provided in a portion of a vertical active of a vertical synchronization signal for the processor 110 and/or at least a portion of a vertical front porch (and/or extended vertical front porch). For example, the at least another command may be provided to the display driver circuitry 120 within a time interval being before the reference time 401 from a start timing of the vertical synchronization signal. For example, since the at least another command is independent of an image transmission, the at least another command may be provided to the display driver circuitry 120 in a time interval being before the reference time 401 from an end timing of the vertical front porch of the vertical synchronization signal being before the extended vertical front porch of the vertical synchronization signal. For example, the amount of time resources used to provide the at least another command may be greater than the amount of time resources used to provide the at least one command.

For example, the processor 110 may provide the display driver circuitry 120 with the at least another command within a time interval 442 from an end timing 441 of a reception of a packet (not illustrated in FIG. 4). As a non-limiting example, the time interval 442 may be terminated before the reference time 401 from a start timing 407. For example, a portion of the time interval 442 may overlap the time interval 405. For example, the processor 110 may provide the display driver circuitry 120 with the at least another command within a time interval 444 from an end timing 443 of a reception of the packet 408. As a non-limiting example, the time interval 444 may be terminated before the reference time 401 from the end timing 410. For example, the time interval 444 may overlap a portion of the vertical front porch 409 before the extended vertical front porch 411. For example, the processor 110 may provide the display driver circuitry 120 with the at least another command within a time interval 445 overlapping at least a portion of the extended vertical front porch 411. As a non-limiting example, the time interval 445 may be terminated before the reference time 401 from the start timing 427. For example, a portion of the time interval 445 may overlap the time interval 425. For example, the processor 110 may provide the display driver circuitry 120 with the at least another command within a time interval 447 from an end timing 446 of a reception of the packet 428. For example, the time interval 447 may overlap a portion of the vertical front porch 429 before the extended vertical front porch 431. As a non-limiting example, the time interval 447 may be terminated before the reference time 401 from the end timing 430.

Referring back to FIG. 1, providing of the at least one command illustrated above may be described in greater detail below with reference to FIGS. 5, 6 and 7.

Figure 5:
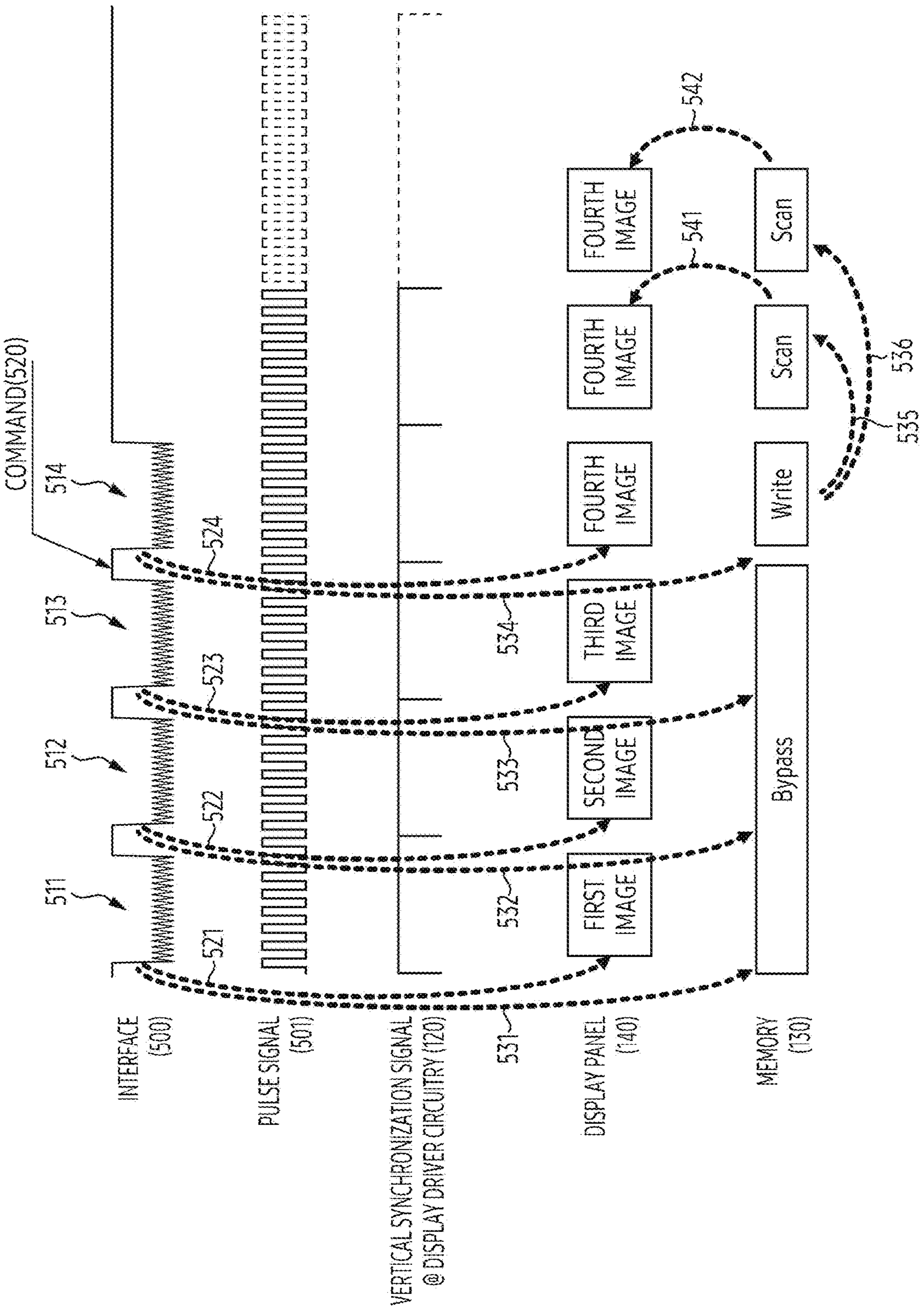
FIG. 5 is a diagram illustrating an example method of providing display driver circuitry with at least one command in a first mode according to various embodiments.

FIG. 5 is a diagram illustrating an example method of providing display driver circuitry with at least one command in a first mode according to various embodiments.

Referring to FIG. 5, the electronic device 100 may include an interface 500 for connecting the processor 110 and the display driver circuitry 120. For example, the interface 500 may be the interface 112 of FIG. 1. For example, the interface 500 may be used to transmit an image from the processor 110 to the display driver circuitry 120.

For example, the processor 110 may provide a pulse signal 501 to the display driver circuitry 120 to synchronize at least a portion of operations of the processor 110 for display of an image and at least a portion of operations of the display driver circuitry 120. As a non-limiting example, the pulse signal 501 may be referred to as an external synchronization signal (Esync). For example, the processor 110 may execute periodic transmissions of the pulse signal 501 for the synchronization. As a non-limiting example, the pulse signal 501 may be provided for the first mode.

For example, the pulse signal 501 may be used to synchronize a horizontal synchronization signal for the processor 110 and a horizontal synchronization signal for the display driver circuitry 120. For example, a period of the pulse signal 501 may correspond to a period of the horizontal synchronization signal for the processor 110. For example, the pulse signal 501 may be used to synchronize a vertical synchronization signal for the processor 110 and a vertical synchronization signal for the display driver circuitry 120. For example, the synchronization between the vertical synchronization signal for the processor 110 and the vertical synchronization signal for the display driver circuitry 120 may be executed by a change of a waveform (or pulse width) of the pulse signal 501. For example, the pulse signal 501 may be used to synchronize an emission synchronization signal for the processor 110 and an emission synchronization signal for the display driver circuitry 120. For example, the synchronization between the emission synchronization signal for the processor 110 and the emission synchronization signal for the display driver circuitry 120 may be executed by a change in a waveform (or pulse width) of the pulse signal 501.

For example, the processor 110 may transmit a first image to the display driver circuitry 120 through the interface 500, as in a state 511. For example, the display driver circuitry 120 may display the first image received from the processor 110 on the display panel 140 based on the first mode, as indicated by arrow 521. For example, the display driver circuitry 120 may bypass storing the first image received from the processor 110 in the memory 130 for the first mode, as indicated by arrow 531. For example, storing of the first image may be bypassed based on a refresh rate for the first image. For example, storing of the first image may be bypassed based on a state of the display panel 140 with a relatively low probability of afterimage and/or blinking. For example, storing of the first image may be bypassed based on a command (e.g., included in the at least one command) that is obtained from the processor 110 and indicates deactivation of storing the image.

For example, the processor 110 may transmit a second image after the first image to the display driver circuitry 120 through the interface 500, as in a state 512. For example, the display driver circuitry 120 may display the second image received from the processor 110 on the display panel 140 based on the first mode, indicated by arrow 522. For example, the display driver circuitry 120 may bypass storing the second image received from processor 110 in the memory 130 for the first mode, as indicated by arrow 532. For example, storing of the second image may be bypassed based on a refresh rate for the second image. For example, storing of the second image may be bypassed based on a state of the display panel 140 with a relatively low probability of afterimage and/or blinking. For example, storing of the second image may be bypassed based on a command (e.g., included in the at least one command) that is obtained from the processor 110 and indicates deactivation of storing the image.

For example, the processor 110 may transmit a third image after the second image to the display driver circuitry 120 through the interface 500, as in a state 513. For example, the display driver circuitry 120 may display the third image received from the processor 110 on the display panel 140 based on the first mode, indicated by arrow 523. For example, the display driver circuitry 120 may bypass storing the third image received from the processor 110 in the memory 130 for the first mode, as indicated by arrow 533. For example, storing of the third image may be bypassed based on a refresh rate for the third image. For example, storing of the third image may be bypassed based on a state of the display panel 140 with a relatively low probability of afterimage and/or blinking. For example, storing of the third image may be bypassed based on a command (e.g., included in the at least one command) that is obtained from the processor 110 and indicates deactivation of storing the image.

For example, the processor 110 may transmit a fourth image to the display driver circuitry 120 through the interface 500, as in a state 514. For example, before transmitting the fourth image, the processor 110 may provide the display driver circuitry 120 with a command 520 that is included in the at least one command and indicates storing of the fourth image in the memory 130 for the first mode. For example, the command 520 may be provided to the display driver circuitry 120 within the time interval 305 of FIG. 3. For example, the command 520 may be a control command to be applied to the fourth image. For example, the processor 110 may provide the control command to the display driver circuitry 120 before the fourth image, based on identifying that an image following the fourth image is not scheduled. For example, the processor 110 may provide the display driver circuitry 120 with the command 520 for the fourth image to be displayed in a low-power state (e.g., always on display (AOD) mode).

For example, the display driver circuitry 120 may display the fourth image received from the processor 110 on the display panel 140, based on the first mode, as indicated only by arrow 524. For example, the display driver circuitry 120 may write the fourth image in the memory 130 based on the command 520, as indicated by arrow 534.

For example, the display driver circuitry 120 may scan the fourth image in the memory 130 for the first mode, as indicated by arrow 535. For example, the display driver circuitry 120 may re-display the fourth image based on scanning of the fourth image, as indicated by arrow 541. As a non-limiting example, the processor 110 may be in a low power state while the re-display of the fourth image is being executed. For example, storing of the fourth image in the memory 130 and scanning of the fourth image stored in the memory 130 may be executed for the processor 110 in the low power state. For example, the re-display of the fourth image may be executed to maintain the fourth image on the display panel 140 while the processor 110 is in the low power state.

For example, the display driver circuitry 120 may scan the fourth image in the memory 130 for the first mode, as indicated by arrow 536. For example, the display driver circuitry 120 may re-display the fourth image based on scanning of the fourth image, as indicated by arrow 542. As a non-limiting example, the processor 110 may be in a low power state while the re-display of the fourth image is being executed. For example, storing of the fourth image in the memory 130 and scanning of the fourth image stored in the memory 130 may be executed for the processor 110 in the low power state. For example, the re-display of the fourth image may be executed to maintain the fourth image on the display panel 140 while the processor 110 is in the low power state.

Figure 6:
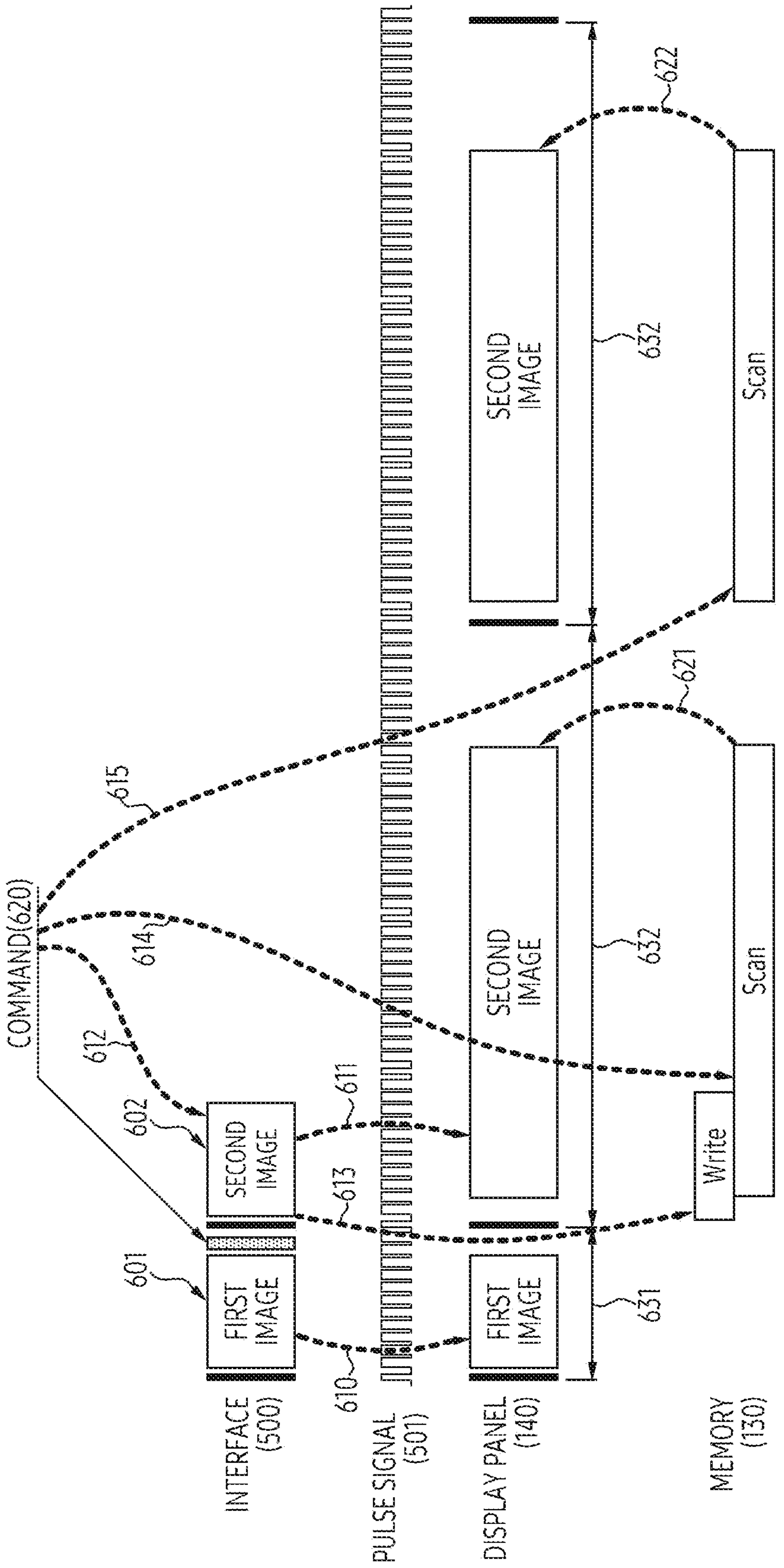
FIGS. 6 and 7 are diagrams illustrating an example method of providing display driver circuitry with at least one command indicating to execute scanning for display of an image based on a second frequency different from a first frequency for an image transmission in a first mode according to various embodiments.
Figure 7:
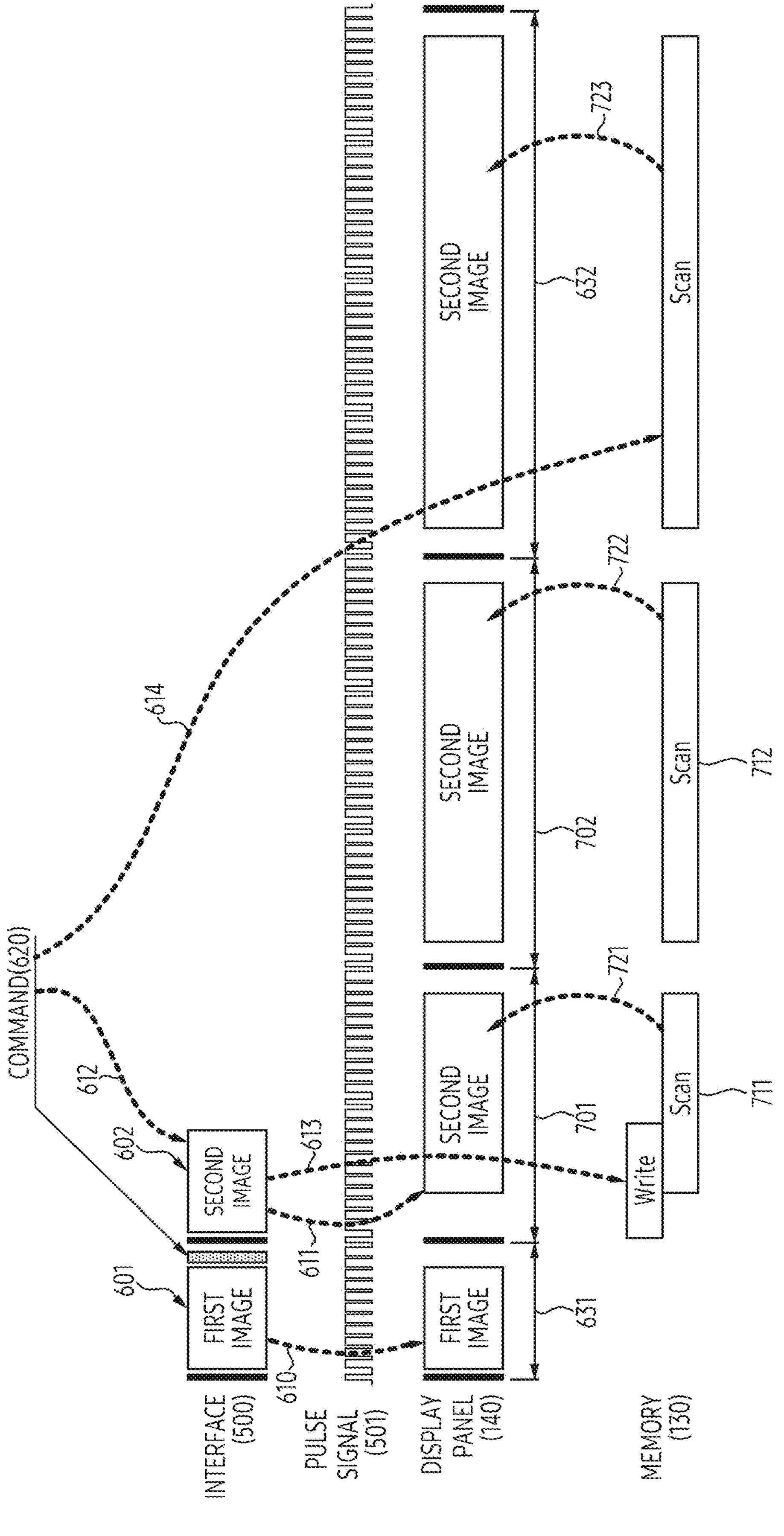

FIGS. 6 and 7 are diagrams illustrating an example method of providing display driver circuitry with at least one command indicating to execute scanning for display of an image based on a second frequency different from a first frequency for an image transmission in a first mode according to various embodiments.

Referring to FIG. 6, the processor 110 may provide a pulse signal 501 to the display driver circuitry 120 to synchronize at least a portion of operations of the processor 110 for display of an image and at least a portion of operations of the display driver circuitry 120. For example, the processor 110 may perform periodic transmissions of the pulse signals 501 for the synchronization. As a non-limiting example, the pulse signal 501 may be provided for the first mode.

For example, the pulse signal 501 may be used to synchronize a horizontal synchronization signal for the processor 110 and a horizontal synchronization signal for the display driver circuitry 120. For example, a period of the pulse signal 501 may correspond to a period of the horizontal synchronization signal for the processor 110. For example, the pulse signal 501 may be used to synchronize a vertical synchronization signal for the processor 110 and a vertical synchronization signal for the display driver circuitry 120. For example, the synchronization between the vertical synchronization signal for the processor 110 and the vertical synchronization signal for the display driver circuitry 120 may be executed by a change in a waveform (or pulse width) of the pulse signal 501. For example, although not illustrated in FIG. 6, the pulse signal 501 may be used to synchronize an emission synchronization signal for the processor 110 and an emission synchronization signal for the display driver circuitry 120. For example, the synchronization between the emission synchronization signal for the processor 110 and the emission synchronization signal for the display driver circuitry 120 may be executed by a change in a waveform (or pulse width) of the pulse signal 501.

For example, the processor 110 may transmit a first image to the display driver circuitry 120 through an interface 500, based on the first mode, as in a state 601. For example, the first image may be transmitted to the display driver circuitry 120 during a time interval corresponding to a first refresh rate. For example, the first image may be transmitted to the display driver circuitry 120 during a time interval corresponding to a maximum frequency supportable through the interface 500. For example, the display driver circuitry 120 may display the first image on the display panel 140 based on the first mode, as indicated by arrow 610. For example, a length of a time interval 631 for displaying the first image may correspond to the first refresh rate. For example, the length of the time interval 631 may correspond to the maximum frequency.

For example, the processor 110 may transmit a second image to the display driver circuitry 120 through the interface 500, based on the first mode, as in a state 602. For example, the second image may be transmitted to the display driver circuitry 120 during a time interval corresponding to the first refresh rate. For example, the second image may be transmitted to the display driver circuitry 120 during a time interval corresponding to a maximum frequency supportable through the interface 500.

For example, before the second image is transmitted, the processor 110 may provide the display driver circuitry 120 with a command 620 to be applied for the second image, as indicated by arrow 612. For example, the command 620 may be included in the at least one command. For example, the command 620 may be provided to display driver circuitry 120 within the time interval 305 of FIG. 3. For example, the command 620 may indicate executing scanning of the second image based on a second frequency different from a first frequency for the transmission of the second image. For example, the second frequency may be lower than the first frequency. As a non-limiting example, the first frequency may correspond to the first refresh rate or the maximum frequency. As a non-limiting example, the second frequency may be lower than the first frequency. For example, the second frequency may be a frequency for a low power state of the electronic device 100 or the processor 110. For example, the command 620 may further indicate storing the second image in the memory 130. For example, the command 620 may be dedicated for the second image. As a non-limiting example, the command 620 may be referred to as a still indication. For example, the still indication may include a sticky flag indication and/or an on-the-fly indication.

For example, the display driver circuitry 120 may display the second image on the display panel 140 based on the command 620, as indicated by arrow 611. For example, the display driver circuitry 120 may store the second image in the memory 130 according to the first frequency, based on the first mode, as indicated by arrow 613. For example, the display driver circuitry 120 may execute scanning of the second image stored in the memory 130 based on the first mode according to the second frequency indicated by the command 620, based on the first mode, as indicated by arrow 614. For example, the scanning of the second image may be executed during a time interval corresponding to the second frequency. For example, the display driver circuitry 120 may display the second image on the display panel 140 based on scanning of the second image, as indicated by arrow 621. A length of a time interval 632 for displaying the second image may correspond to a second refresh rate lower than the first refresh rate. For example, the length of the time interval 632 may correspond to the second frequency.

For example, the display driver circuitry 120 may execute scanning of the second image stored in the memory 130 based on the first mode, as indicated by arrow 615. For example, the scanning of the second image may be executed during a time interval corresponding to the second frequency. For example, the display driver circuitry 120 may re-display the second image on the display panel 140 based on the scanning of the second image, as indicated by arrow 622. A length of the time interval 632 for the re-display of the second image may correspond to a second refresh rate lower than the first refresh rate. For example, the length of the time interval 632 may correspond to the second frequency.

Although FIG. 6 illustrates an example in which the display driver circuitry 120 directly sets a frequency for the second image to the second frequency indicated by the command 620, the display driver circuitry 120 may change the frequency for the second image to the second frequency after changing the frequency for the second image from the first frequency to at least one intermediate frequency lower than the first frequency and higher than the second frequency. A method of changing the frequency for the second image to the second frequency via the at least one intermediate frequency may be in greater detail below with reference to FIG. 7.

Referring to FIG. 7, the processor 110 may transmit a first image to the display driver circuitry 120 through the interface 500, based on the first mode, as in a state 601. For example, the first image may be transmitted to the display driver circuitry 120 during a time interval corresponding to a first refresh rate. For example, the first image may be transmitted to the display driver circuitry 120 during a time interval corresponding to a maximum frequency supportable through the interface 500. For example, the display driver circuitry 120 may display the first image on the display panel 140 based on the first mode, as indicated by arrow 610. For example, a length of a time interval 631 for displaying the first image may correspond to the first refresh rate. For example, the length of the time interval 631 may correspond to the maximum frequency.

For example, the processor 110 may transmit a second image to the display driver circuitry 120 through the interface 500, based on the first mode, as in a state 602. For example, the second image may be transmitted to the display driver circuitry 120 during a time interval corresponding to the first refresh rate. For example, the second image may be transmitted to the display driver circuitry 120 during a time interval corresponding to a maximum frequency supportable through the interface 500.

For example, the processor 110 may provide the display driver circuitry 120 with a command 620 to be applied for the second image before the second image is transmitted, as indicated by arrow 612. For example, the command 620 may be included in the at least one command. For example, the command 620 may be provided to display driver circuitry 120 within the time interval 305 of FIG. 3. For example, the command 620 may indicate executing scanning of the second image based on a second frequency different from a first frequency for the transmission of the second image. For example, the second frequency may be lower than the first frequency. As a non-limiting example, the first frequency may correspond to the first refresh rate or the maximum frequency. As a non-limiting example, the second frequency may be lower than the first frequency. For example, the second frequency may be a frequency for a low power state of the electronic device 100 or the processor 110. For example, the command 620 may further indicate storing the second image in the memory 130. For example, the command 620 may be dedicated for the second image.

For example, the display driver circuitry 120 may display the second image on the display panel 140 based on the command 620, as indicated by arrow 611. For example, the display driver circuitry 120 may store the second image in the memory 130 according to the first frequency, based on the first mode, as indicated by arrow 613. For example, the display driver circuitry 120 may execute scanning 711 of the second image stored in the memory 130 based on the first mode according to a third frequency (e.g., the at least one intermediate frequency) higher than the second frequency indicated by the command 620 and lower than the first frequency, based on the first mode. For example, scanning 711 of the second image may be executed to reduce occurrence of blinking on the display panel 140 due to a direct change from the first frequency to the second frequency. For example, the display driver circuitry 120 may identify the third frequency to reduce the occurrence of the blinking. For another example, the third frequency may also be indicated by the command 620. For example, scanning 711 of the second image may be executed during a time interval corresponding to the third frequency. For example, the display driver circuitry 120 may display the second image on the display panel 140 based on scanning 711 of the second image, as indicated by arrow 721. A length of a time interval 701 for displaying the second image may correspond to a third refresh rate lower than the first refresh rate and higher than the second refresh rate. For example, the length of the time interval 701 may correspond to the third frequency.

For example, the display driver circuitry 120 may execute scanning 712 of the second image stored in the memory 130 based on the first mode according to a fourth frequency (e.g., the at least one intermediate frequency) higher than the second frequency indicated by the command 620 and lower than the third frequency, based on the first mode. For example, scanning 712 of the second image may be executed to reduce occurrence of blinking on the display panel 140 due to a direct change from the first frequency to the second frequency. For example, the display driver circuitry 120 may identify the fourth frequency to reduce the occurrence of the blinking. For another example, the fourth frequency may also be indicated by the command 620. For example, scanning 712 of the second image may be executed during a time interval corresponding to the fourth frequency. For example, the display driver circuitry 120 may re-display the second image on the display panel 140 based on scanning 712 of the second image, as indicated by arrow 722. A length of the time interval 702 for the re-display of the second image may correspond to a fourth refresh rate lower than the third refresh rate and higher than the second refresh rate. For example, the length of the time interval 702 may correspond to the fourth frequency.

For example, the display driver circuitry 120 may execute scanning of the second image stored in the memory 130 based on the first mode according to the second frequency indicated by the command 620, based on the first mode, as indicated by arrow 614. For example, scanning of the second image may be executed during a time interval corresponding to the second frequency. For example, the display driver circuitry 120 may re-display the second image on the display panel 140 based on the scanning of the second image, as indicated by arrow 723. A length of the time interval 632 for the re-display of the second image may correspond to the second frequency corresponding to the second refresh rate.

Referring back to FIG. 1, the at least one command illustrated above may include a command indicating a timing executing re-display of an image. Providing the command may be described in greater detail below with reference to FIG. 8.

Figure 8:
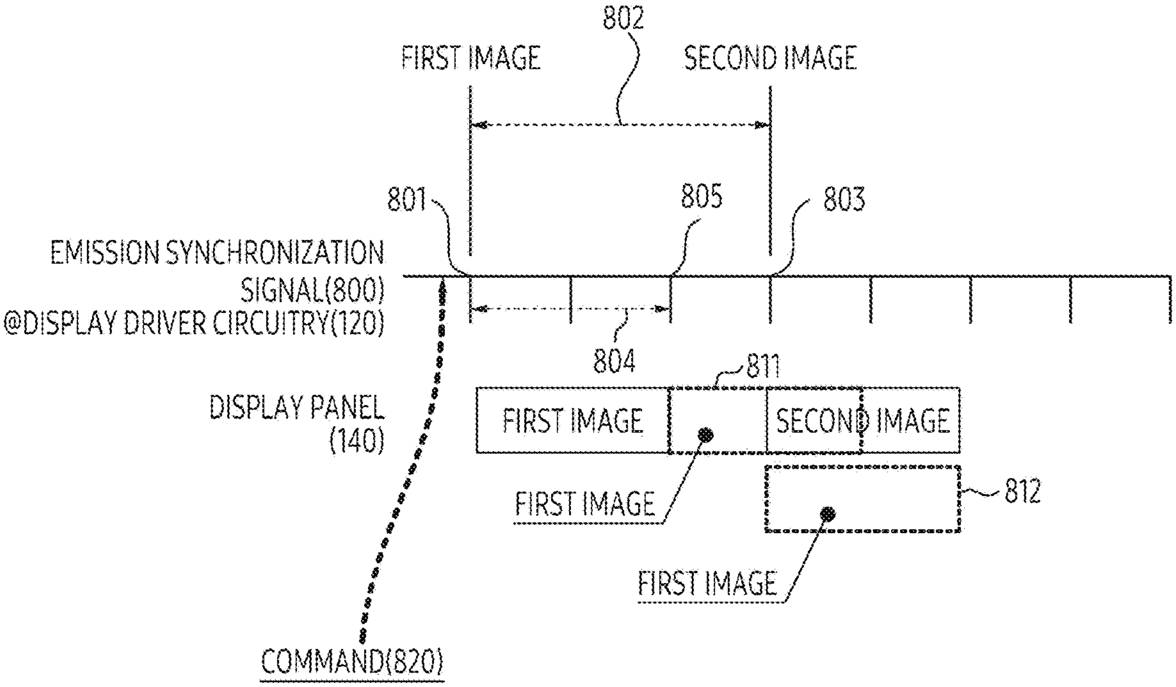
FIG. 8 is a diagram illustrating an example method of providing display driver circuitry with a command indicating a timing executing re-display of an image according to various embodiments.

FIG. 8 is a diagram illustrating an example method of providing display driver circuitry with a command indicating a timing executing re-display of an image.

Referring to FIG. 8, the processor 110 may transmit a first image to the display driver circuitry 120 from a timing 801. Although not illustrated in FIG. 8, the first image may be transmitted through an interface 500. For example, the processor 110 may provide the display driver circuitry 120 with a command 820 capable of being applied for the first image before the first image is transmitted. As a non-limiting example, the command 820 may be referred to as still indication. For example, the still indication may include a sticky flag indication and/or an on-the-fly indication. As a non-limiting example, the command 820 may be provided for the first mode. For example, the command 820 may indicate a timing executing re-display of the first image. For example, the command 820 may indicate executing the re-display of the first image at a timing 803 after a reference time 802 from a start timing 801 (or a start timing 801 of a transmission of the first image) of display of the first image. For example, the reference time 802 may be longer than a length of a time interval 804 corresponding to a maximum frequency supportable through the interface 500 for the first mode. For example, the reference time 802 may correspond to a frequency (e.g., 80 hertz (Hz)) lower than the maximum frequency (e.g., about 120 Hz). For example, the command 820 may be provided to the display driver circuitry 120 to execute a transmission of a second image after the first image at a timing 805 after the reference time 804 from the timing 801. For example, the command 820 may be provided to the display driver circuitry 120, in order to delay a scan of the first image (e.g., a scan of the first image stored in the memory 130 according to an image transmission from the timing 801) capable of being executed from the timing 805, to after the timing 803. For example, the command 820 may further indicate storing the first image in the memory 130. For example, the command 820 may further indicate transmitting the second image after the first image from the timing 803.

For example, the display driver circuitry 120 may display the first image received from the timing 801 on the display panel 140. Although not illustrated in FIG. 8, the display driver circuitry 120 may store the first image received from the timing 801 in the memory 130. For example, the display driver circuitry 120 may refrain from or delay executing for re-display 811 of the first image from the timing 805, based on the command 820.

For example, the processor 110 may transmit the second image to the display driver circuitry 120 from the timing 803. Although not illustrated in FIG. 8, the second image may be transmitted through the interface 500. For example, the display driver circuitry 120 may display the second image received from the processor 110 on the display panel 140. For example, the re-display 812 of the first image from the timing 803 may be canceled according to display of the second image. For example, the display driver circuitry 120 may cancel the re-display 812 of the first image from the timing 803, in response to the second image received at the timing 803.

As described above, the processor 110 may control a timing of re-display of an image of the display driver circuitry 120, using a command 820 applicable to the first image.

Referring back to FIG. 1, the processor 110 may be configured to obtain a first image to be transmitted from the processor 110 to the display driver circuitry 120. For example, the processor 110 may be configured to provide, to the display driver circuitry 120, in a time interval in an extended vertical front porch of a second vertical synchronization signal for the processor 110, at least one command to be applied to the first image from among the first image and a second image that is in the memory, wherein the time interval, in the extended vertical front porch of the second vertical synchronization signal for the processor 110, is before a reference time from a start timing of a first vertical synchronization signal for the processor 110. For example, the processor 110 may be configured to, based on the start timing, transmit, to the display driver circuitry 120, the first image.

For example, the display driver circuitry 120 may be configured to, based on applying, to the image received based on the start timing, the at least one command obtained in the time interval, display, on the display panel 140, the image.

For example, the display driver circuitry 120 may be configured to, based on scanning the second image in the memory 130 in at least a portion of the extended vertical front porch, display, on the display panel 140, the second image. For example, the display driver circuitry 120 may be configured to, after scanning of the second image is terminated, obtain the at least one command in the time interval from the processor 110.

For example, the extended vertical front porch may be a time interval capable of displaying, on the display panel 140, the second image by scanning, by the display driver circuitry 120, the second image in the memory 130.

For example, the processor 110 may be configured to transmit, to the display driver circuitry 120, a vertical sync start (VSS) packet at the start timing of the first vertical synchronization signal that is between a timing in the time interval at which the at least one command is provided and a start timing of the transmission of the first image.

For example, the time interval may be between an end timing of scanning of the second image in the memory and a timing that is before the reference time from the start timing, wherein scanning of the second image in the memory is capable of being executed by the display driver circuitry 120 from among the processor 110 and the display driver circuitry 120.

For example, the processor 110 may be configured to provide, to the display driver circuitry 120, in another time interval in the extended vertical front porch that is before the time interval, at least another command to be applied to at least one of the first image and the second image.

For example, the at least one command may comprise a command for changing a refresh rate for display on the display panel 140. For example, the at least another command may comprise a command for changing a brightness level of the display on the display panel 140.

For example, an image transmission from the processor 110 to the display driver circuitry 120 may be initiated at least a portion of start timings of an emission synchronization signal for the processor, the emission synchronization signal, having a period shorter than a period of the vertical synchronization signal, indicating a start timing of an emission period of the display panel 140. For example, the another time interval may be between a start timing of the emission synchronization signal in the extended vertical front porch not overlapping a start timing of the extended vertical front porch and a timing in the extended vertical front porch being before a reference time from the start timing of the first vertical synchronization signal.

For example, the processor 110 may be configured to, based on a start timing of a vertical synchronization signal for the processor 110 being after providing, to the display driver circuitry 120, the at least one command from among the at least one command and the at least another command, execute an image transmission from the processor 110 to the display driver circuitry 120.

For example, the at least one command may comprise a command for changing a first mode that executes an image transmission from the processor 110 to the display driver circuitry 120 based on a timing identified by the processor 110 to a second mode that executes the image transmission based on a timing identified by the display driver circuitry 120.

For example, the processor 110 may be configured to, in the second mode, receive a signal indicating a timing of the image transmission from the display driver circuitry 120. For example, the processor 110 may be configured to, in response to the signal, provide the at least one command to be applied to a third image, in another time interval between a reception timing of the signal and a timing in a vertical front porch of a fourth vertical synchronization signal being before another reference time from a start timing of a third vertical synchronization signal for the processor 110 identified based on the signal, to the display driver circuitry 120. For example, the processor 110 may be configured to, based on the start timing of the third vertical synchronization signal, transmit, to the display driver circuitry 120, the third image.

For example, the display driver circuitry 120 may be configured to obtain the at least one command in the another time interval. For example, the display driver circuitry 120 may be configured to store, in the memory 130, the third image. For example, the display driver circuitry 120 may be configured to display, on the display panel 140, the third image by scanning the third image in the memory 130 based on the at least one command.

For example, the processor 110 may be configured to provide at least one command to the display driver circuitry 120, in a portion of an extended vertical front porch of a vertical synchronization signal for the processor 110 being before a reference time from a timing of an image transmission from the processor 110 to the display driver circuitry 120. For example, the processor 110 may be configured to provide at least another command to the display driver circuitry 120, in another portion of the extended vertical front porch being before the portion of the extended vertical front porch of the vertical synchronization signal and the portion of the extended vertical front porch.

For example, the processor 110 may be configured to execute the image transmission, based on a start timing of another vertical synchronization signal for the processor 110 after providing the display driver circuitry 120 with the at least one command among the at least one command and the at least another command.

For example, the processor 110 may be configured to refrain from providing the display driver circuitry 120 with the at least one command, in a vertical front porch of the vertical synchronization signal before the extended vertical front porch. For example, the processor 110 may be configured to provide at least another command in the vertical front porch.

For example, the processor 110 may be configured to provide the at least one command in the portion of the extended vertical front porch among the portion of the extended vertical front porch and the another portion of the extended vertical front porch, in order to apply the at least one command, among an image provided to the display driver circuitry 120 according to the image transmission and another image stored in the memory 130 before the image transmission, to the image.

For example, the at least one command may be provided to the display driver circuitry 120 after scanning of the another image in the memory 130 is terminated.

For example, the another portion of the extended vertical front porch may be a time interval capable of displaying the another image on the display panel 140 by scanning the another image.

The electronic device 100 as described above may be described in greater detail below with reference to FIGS. 9 and 10.

FIG. 9 is a block diagram illustrating an example electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In various embodiments, at least one of the components (e.g., the connecting terminal 978) may be omitted from the electronic device 901, or one or more other components may be added in the electronic device 901. In various embodiments, some of the components (e.g., the sensor module 976, the camera module 980, or the antenna module 997) may be implemented as a single component (e.g., the display module 960).

The processor 920 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, an HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 964 dB or less) for implementing mMTC, or U-plane latency (e.g., 0.5 ms or less for each of downlink (DL) and uplink (UL), or a round trip of 9 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element including a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In an embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

FIG. 10 is a block diagram 1000 illustrating an example configuration of a display module 960 according to various embodiments. Referring to FIG. 10, the display module 960 may include a display 1010 and a display driver integrated circuit (DDI) 1030 to control the display 1010. The DDI 1030 may include an interface module (e.g., including various circuitry and/or executable program instructions) 1031, memory 1033 (e.g., buffer memory), an image processing module (e.g., including various circuitry and/or executable program instructions) 1035, and/or a mapping module (e.g., including various circuitry and/or executable program instructions) 1037. The DDI 1030 may receive image information that contains image data or an image control signal corresponding to a command to control the image data from another component of the electronic device 901 via the interface module 1031. For example, according to an embodiment, the image information may be received from the processor 920 (e.g., the main processor 921 (e.g., an application processor)) or the auxiliary processor 923 (e.g., a graphics processing unit) operated independently from the function of the main processor 921. The DDI 1030 may communicate, for example, with touch circuitry 1050 or the sensor module 976 via the interface module 1031. The DDI 1030 may also store at least part of the received image information in the memory 1033, for example, on a frame by frame basis. The image processing module 1035 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1010. The mapping module 1037 may generate a voltage value or a current value corresponding to the image data pre-processed or post-processed by the image processing module 1035. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

According to an embodiment, the display module 960 may further include the touch circuitry 1050. The touch circuitry 1050 may include a touch sensor 1051 and a touch sensor IC 1053 to control the touch sensor 1051. The touch sensor IC 1053 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electric charges) corresponding to the certain position on the display 1010. The touch circuitry 1050 may provide input information (e.g., a position, an area, a pressure, or a time) indicative of the touch input or the hovering input detected via the touch sensor 1051 to the processor 920. According to an embodiment, at least part (e.g., the touch sensor IC 1053) of the touch circuitry 1050 may be formed as part of the display 1010 or the DDI 1030, or as part of another component (e.g., the auxiliary processor 923) disposed outside the display module 960.

According to an embodiment, the display module 960 may further include at least one sensor (e.g., a fingerprint sensor, an iris sensor, a pressure sensor, or an illuminance sensor) of the sensor module 976 or a control circuit for the at least one sensor. In such a case, the at least one sensor or the control circuit for the at least one sensor may be embedded in one portion of a component (e.g., the display 1010, the DDI 1030, or the touch circuitry 1050)) of the display module 960. For example, when the sensor module 976 embedded in the display module 960 includes a biometric sensor (e.g., a fingerprint sensor), the biometric sensor may obtain biometric information (e.g., a fingerprint image) corresponding to a touch input received via a portion of the display 1010. As another example, when the sensor module 976 embedded in the display module 960 includes a pressure sensor, the pressure sensor may obtain pressure information corresponding to a touch input received via a partial or whole area of the display 1010. According to an embodiment, the touch sensor 1051 or the sensor module 976 may be disposed between pixels in a pixel layer of the display 1010, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” or “connected with” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

at least one processor comprising processing circuitry;

memory comprising one or more storage media storing instructions; and a display including:

display driver circuitry including a frame buffer memory, and a display panel, wherein the instructions, when executed by the at least one processor individually or collectively, cause the at least one processor to:

obtain a first image to be transmitted from the at least one processor to the display driver circuitry;

before transmitting the first image to the display driver circuitry provide, to the display driver circuitry, in a time interval in an extended vertical front porch of a second vertical synchronization signal for the at least one processor, at least one command to be applied to the first image from among the first image and a second image that has been stored in the frame buffer memory, wherein the time interval, in the extended vertical front porch of the second vertical synchronization signal for the at least one processor, is before a reference time from a start timing of a first vertical synchronization signal for the at least one processor subsequent to the second vertical synchronization signal for the at least one processor, wherein the at least one command is transmitted in the time interval to indicate applying the at least one command to the first image; and after the at least one command is provided to the display driver circuitry in the time interval, transmit, to the display driver circuitry, the first image based on the start timing of the first vertical synchronization signal for the at least one processor.

2. The electronic device of claim 1, wherein the display driver circuitry is configured to:

based on applying, to the first image received based on the start timing, the at least one command obtained in the time interval, display, on the display-panelvia the display panel, the first image.

3. The electronic device of claim 1, wherein the display driver circuitry is configured to:

based on scanning the second image in the frame buffer memory in at least a portion of the extended vertical front porch, display, via the display panel, the second image; and after scanning of the second image is terminated, obtain the at least one command in the time interval from the at least one processor.

4. The electronic device of claim 1, wherein the extended vertical front porch is a time interval during which the display driver circuitry is capable of displaying, via the display panel, the second image by scanning, by the display driver circuitry, the second image in the frame buffer memory.

5. The electronic device of claim 1, wherein the instructions, when executed by the at least one processor individually or collectively, cause the at least one processor to:

transmit, to the display driver circuitry, a vertical sync start (VSS) packet at the start timing of the first vertical synchronization signal between a timing in the time interval at which the at least one command is provided and a start timing of the transmission of the first image.

6. The electronic device of claim 1, wherein the time interval is between an end timing of scanning of the second image in the frame buffer memory and a timing before the reference time from the start timing, and wherein scanning of the second image in the frame buffer memory is capable of being executed by the display driver circuitry from among the at least one processor and the display driver circuitry.

7. The electronic device of claim 1, wherein the instructions, when executed by the at least one processor individually or collectively, cause the at least one processor to:

provide, to the display driver circuitry, in another time interval in the extended vertical front porch before the time interval, at least another command to be applied to the first image and/or the second image.

8. The electronic device of claim 7, wherein the at least one command comprises a command for changing a refresh rate for display via the display panel, and wherein the at least another command comprises a command for changing a brightness level of the display via the display panel.

9. The electronic device of claim 7, wherein an image transmission from the at least one processor to the display driver circuitry is capable of being initiated at least a portion of start timings of an emission synchronization signal for the at least one processor, the emission synchronization signal, having a period shorter than a period of a vertical synchronization signal, indicating a start timing of an emission period of the display panel, and wherein the another time interval is between a start timing of the emission synchronization signal in the extended vertical front porch not overlapping a start timing of the extended vertical front porch and a timing in the extended vertical front porch being before a reference time from the start timing of the first vertical synchronization signal.

10. The electronic device of claim 7, wherein the instructions, when executed by the at least one processor individually or collectively, cause the at least one processor to:

based on a start timing of a vertical synchronization signal for the at least one processor being provided to the display driver circuitry after the at least one command from among the at least one command and the at least another command is provided, execute an image transmission from the at least one processor to the display driver circuitry.

11. The electronic device of claim 1, wherein the at least one command comprises a command for changing a first mode that executes an image transmission from the at least one processor to the display driver circuitry based on a timing identified by the at least one processor to a second mode that executes the image transmission based on a timing identified by the display driver circuitry.

12. The electronic device of claim 11, wherein the instructions, when executed by the at least one processor individually or collectively, cause the at least one processor to:

in the second mode, receive a signal indicating a timing of the image transmission from the display driver circuitry;

in response to the signal, provide the at least one command to be applied to a third image, in another time interval between a reception timing of the signal and a timing in a vertical front porch of a fourth vertical synchronization signal being before another reference time from a start timing of a third vertical synchronization signal for the at least one processor identified based on the signal, to the display driver circuitry; and based on the start timing of the third vertical synchronization signal, transmit, to the display driver circuitry, the third image, and wherein a length of the another reference time is identical to or different from a length of the reference time.

13. The electronic device of claim 12, wherein the display driver circuitry is configured to:

obtain the at least one command in the another time interval;

store, in the frame buffer memory, the third image; and display, via the display panel, the third image by scanning the third image in the frame buffer memory based on the at least one command obtained in the another time interval.

14. An electronic device comprising:

at least one processor comprising processing circuitry;

memory comprising one or more storage media storing instructions; and a display including:

display driver circuitry including a memoryframe buffer memory, and a display panel, wherein the instructions, when executed by the at least one processor individually or collectively, cause the at least one processor to:

provide, to the display driver circuitry, at least one command in a portion of an extended vertical front porch of a vertical synchronization signal for the at least one processor before a reference time from a timing of an image transmission from the at least one processor to the display driver circuitry; and provide, to the display driver circuitry, at least another command in the portion of the extended vertical front porch and another portion of the extended vertical front porch before the portion of the extended vertical front porch.

15. The electronic device of claim 14, wherein the instructions, when executed by the at least one processor individually or collectively, cause the at least one processor to:

based on a start timing of another vertical synchronization signal for the at least one processor being provided after the at least one command from among the at least one command and the at least another command is provided to the display driver circuitry, execute the image transmission.

16. The electronic device of claim 14, wherein the instructions, when executed by the at least one processor individually or collectively, cause the at least one processor to:

refrain from providing the at least one command to the display driver circuitry in a vertical front porch of the vertical synchronization signal being before the extended vertical front porch; and provide the at least another command to the display driver circuitry in the vertical front porch.

17. The electronic device of claim 14, wherein the instructions, when executed by the at least one processor individually or collectively, cause the at least one processor to:

provide the at least one command in the portion of the extended vertical front porch from among the portion of the extended vertical front porch and the another portion of the extended vertical front porch, for applying the at least one command to, from among an image provided to the display driver circuitry according to the image transmission and another image stored in the frame buffer memory before the image transmission, the image.

18. The electronic device of claim 17, wherein the at least one command is provided to the display driver circuitry after a termination of scanning of the another image in the frame buffer memory.

19. The electronic device of claim 17, wherein the another portion of the extended vertical front porch is a time interval capable of displaying the other image via the display panel by scanning the other image.

20. A method executed in an electronic device including at least one processor and a display including display driver circuitry comprising a frame buffer memory and a display panel, the method comprising:

obtaining a first image to be transmitted from the at least one processor to the display driver circuitry;

before transmitting the first image from the at least one processor to the display driver circuitry providing, from the at least one processor to the display driver circuitry, in a time interval in an extended vertical front porch of a second vertical synchronization signal for the at least one processor, at least one command to be applied to the first image from among the first image and a second image that has been stored in the frame buffer memory, wherein the time interval, in the extended vertical front porch of the second vertical synchronization signal for the at least one processor, is before a reference time from a start timing of a first vertical synchronization signal for the at least one processor subsequent to the second vertical synchronization signal for the least one processor, wherein the at least one command is transmitted in the time interval to indicate applying the at least one command to the first image; and after the at least one command is provided from the at least one processor to the display driver circuitry in the time interval transmitting, from the at least one processor to the display driver circuitry, the first image based on the start timing of the first vertical synchronization signal for the at least one processor.

* * * * *